July 16, 1963 H. N. DEAN ETAL 3,097,943
APPARATUS FOR PRODUCING MULTIPLE GLASS SHEET GLAZING UNITS
Filed March 18, 1960 8 Sheets-Sheet 1
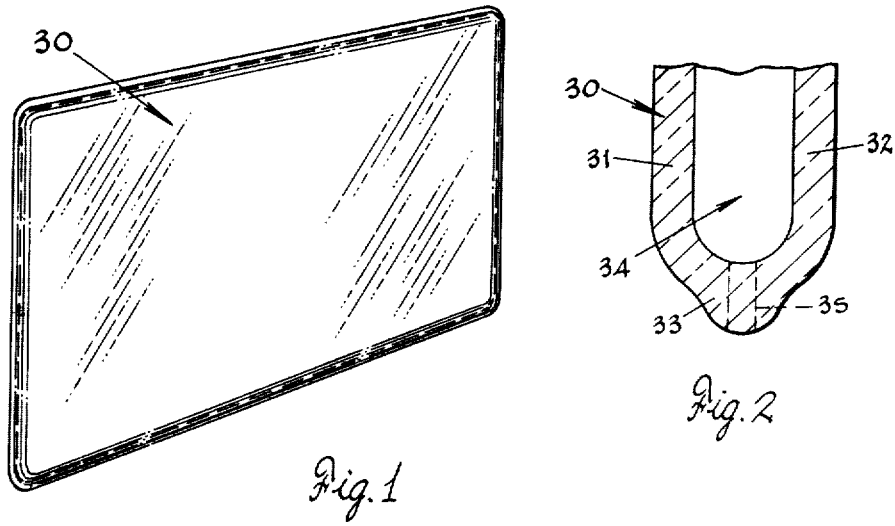
Fig. 1
Fig. 2
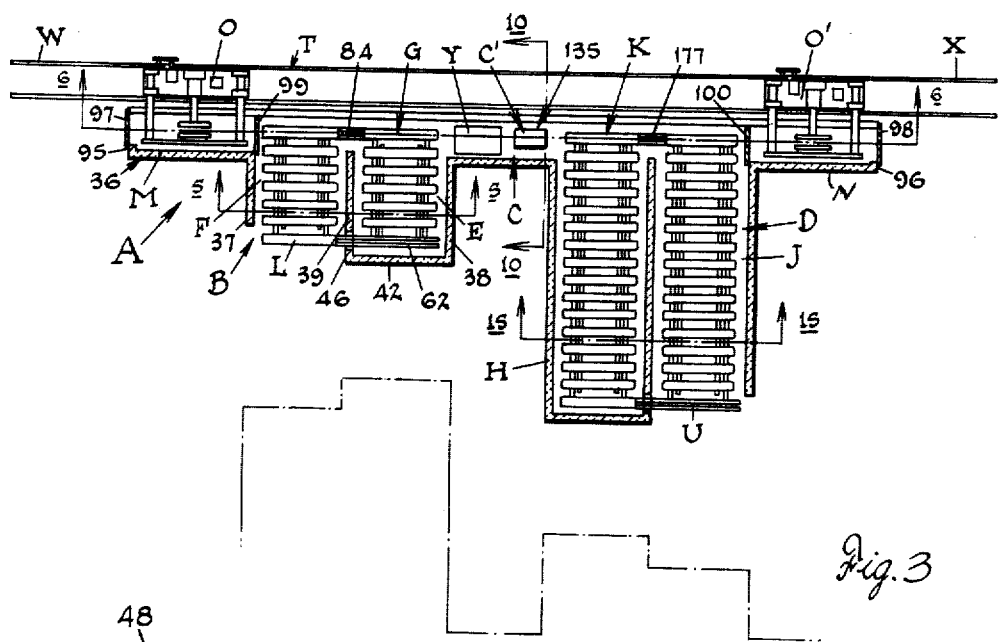
Fig. 3
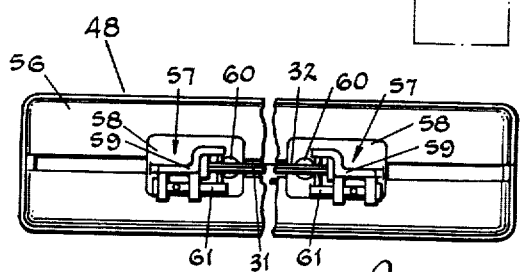
Fig. 7
INVENTORS
Harry N. Dean and
BY Albert W. Olson
Nobbe & Swope
ATTORNEYS July 16, 1963    H. N. DEAN ETAL    3,097,943
APPARATUS FOR PRODUCING MULTIPLE GLASS SHEET GLAZING UNITS
Filed March 18, 1960    8 Sheets-Sheet 2
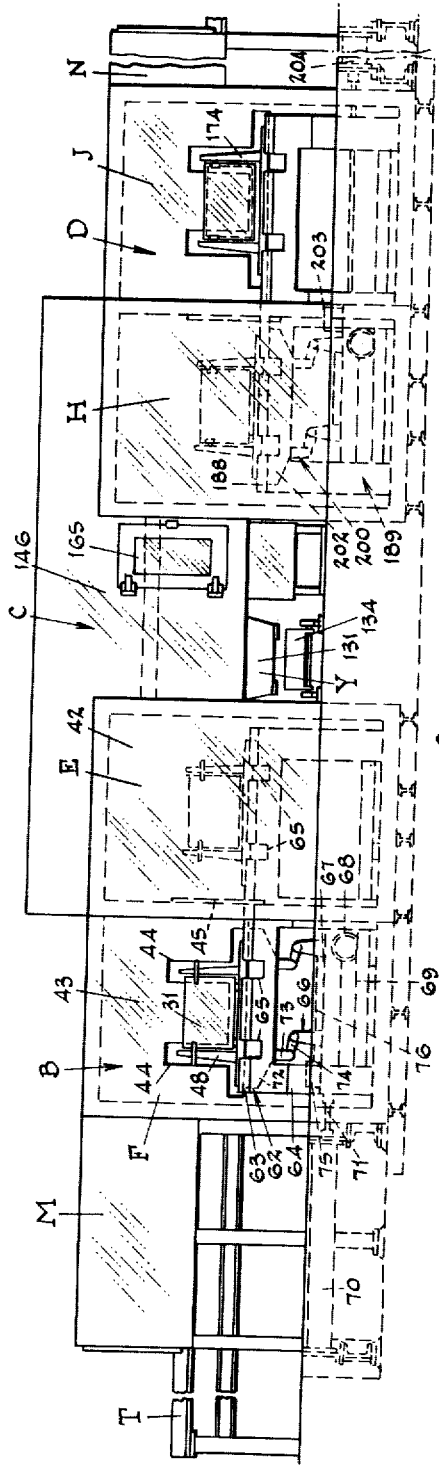
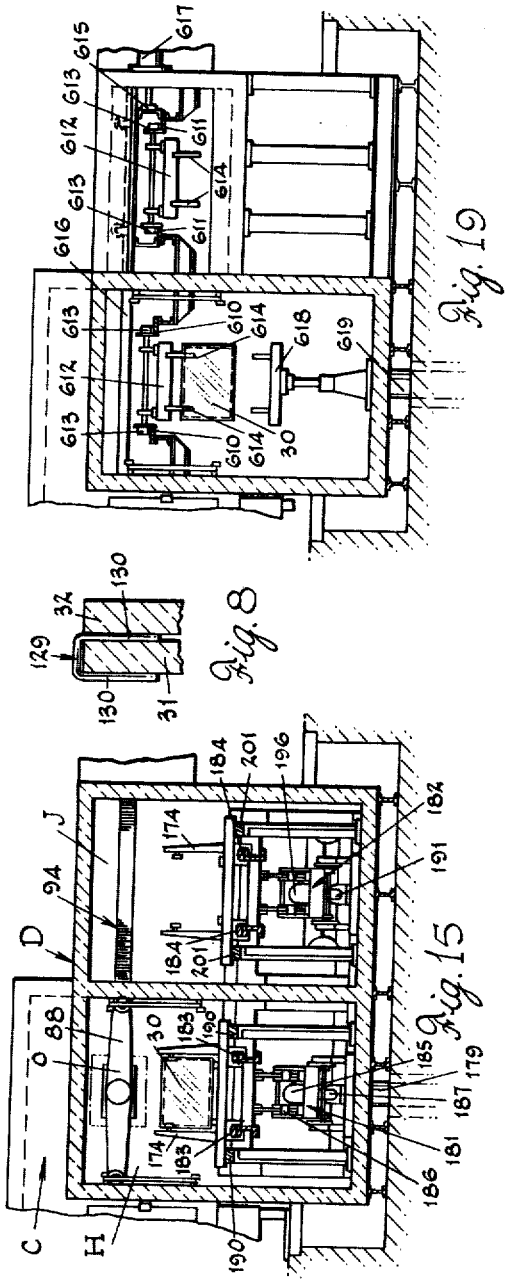
INVENTORS
Harry N. Dean and
BY Albert W. Olson
Nobbe & Swope
ATTORNEYS

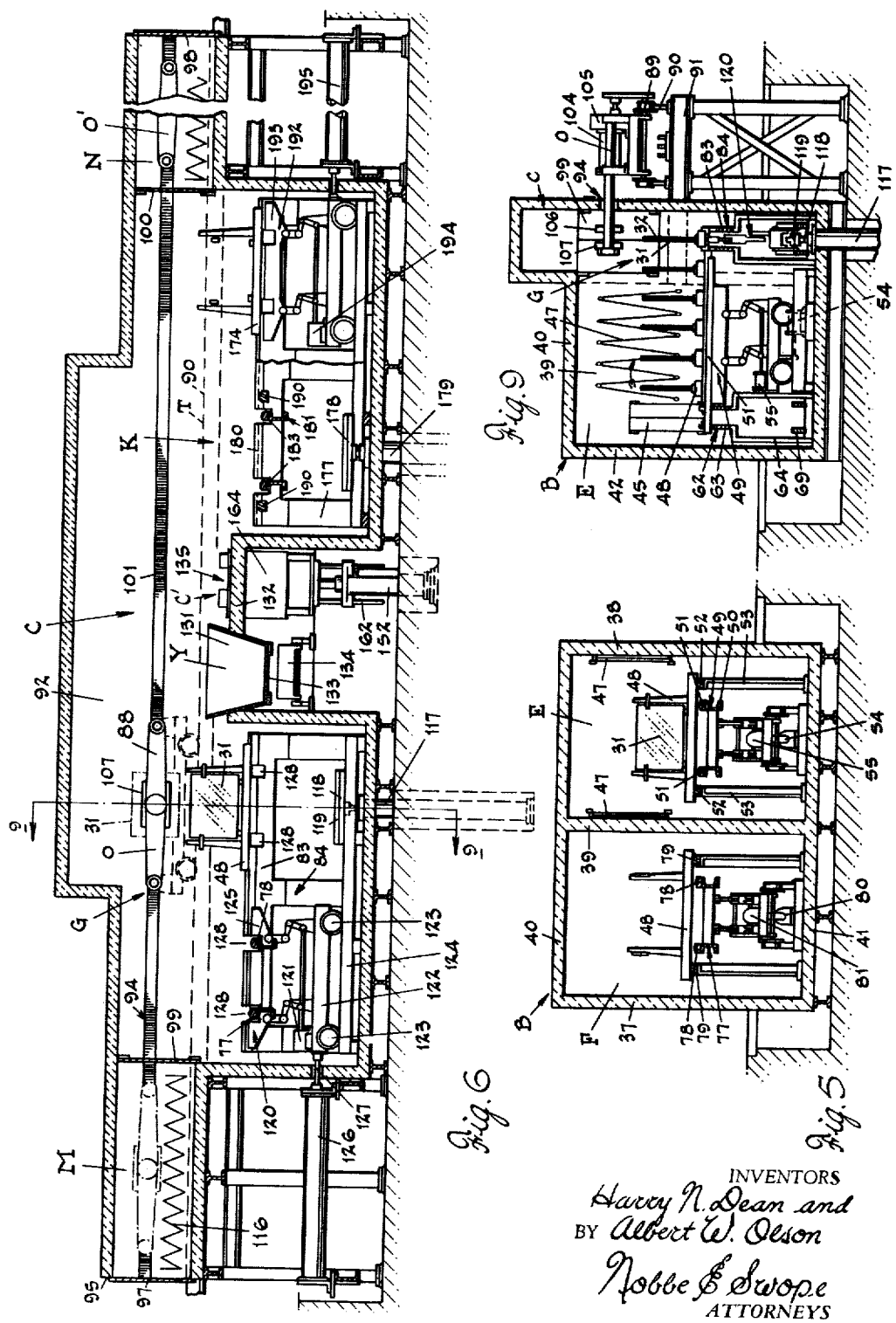

July 16, 1963
H. N. DEAN ETAL
3,097,943
APPARATUS FOR PRODUCING MULTIPLE GLASS SHEET GLAZING UNITS
Filed March 18, 1960
8 Sheets-Sheet 4
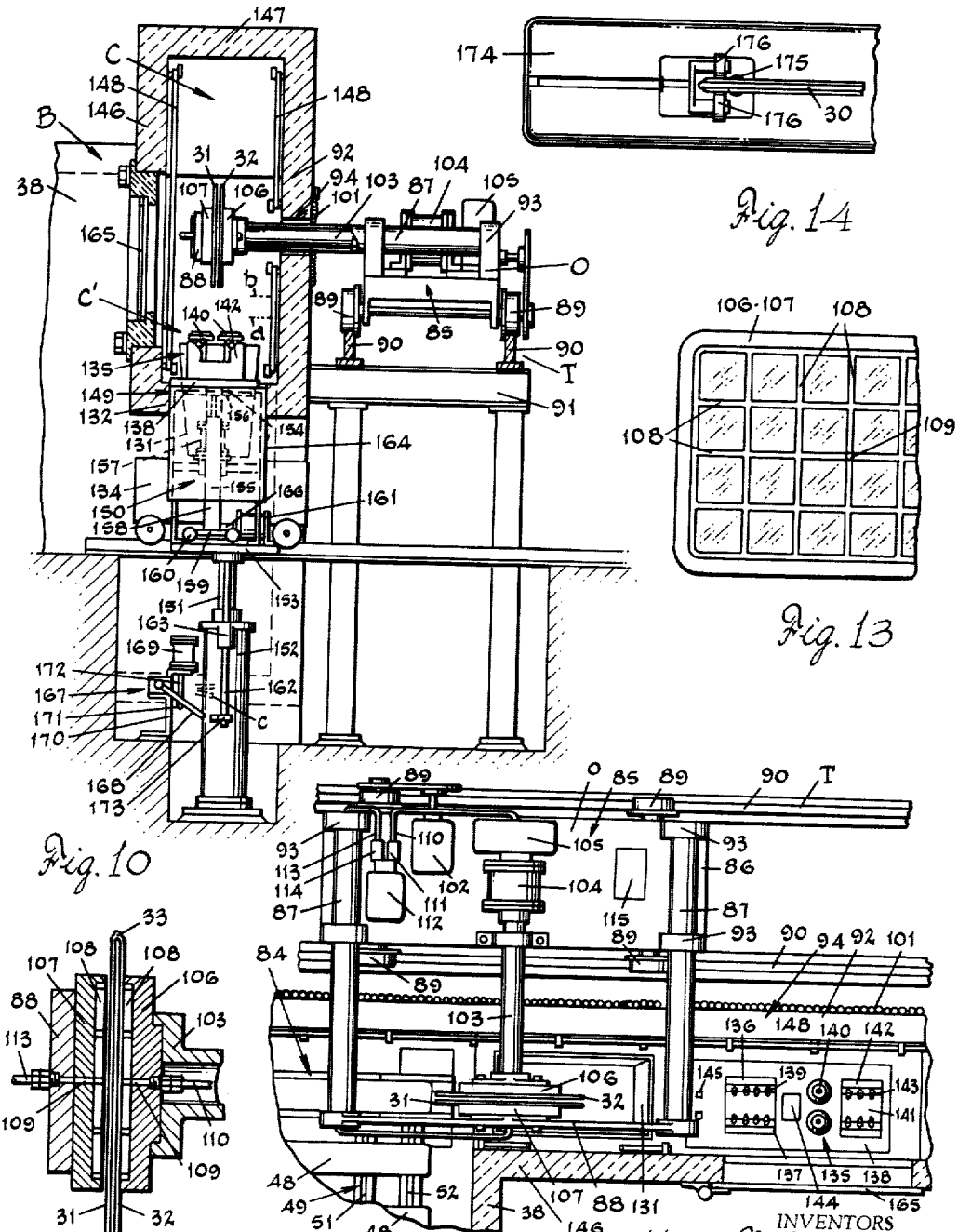

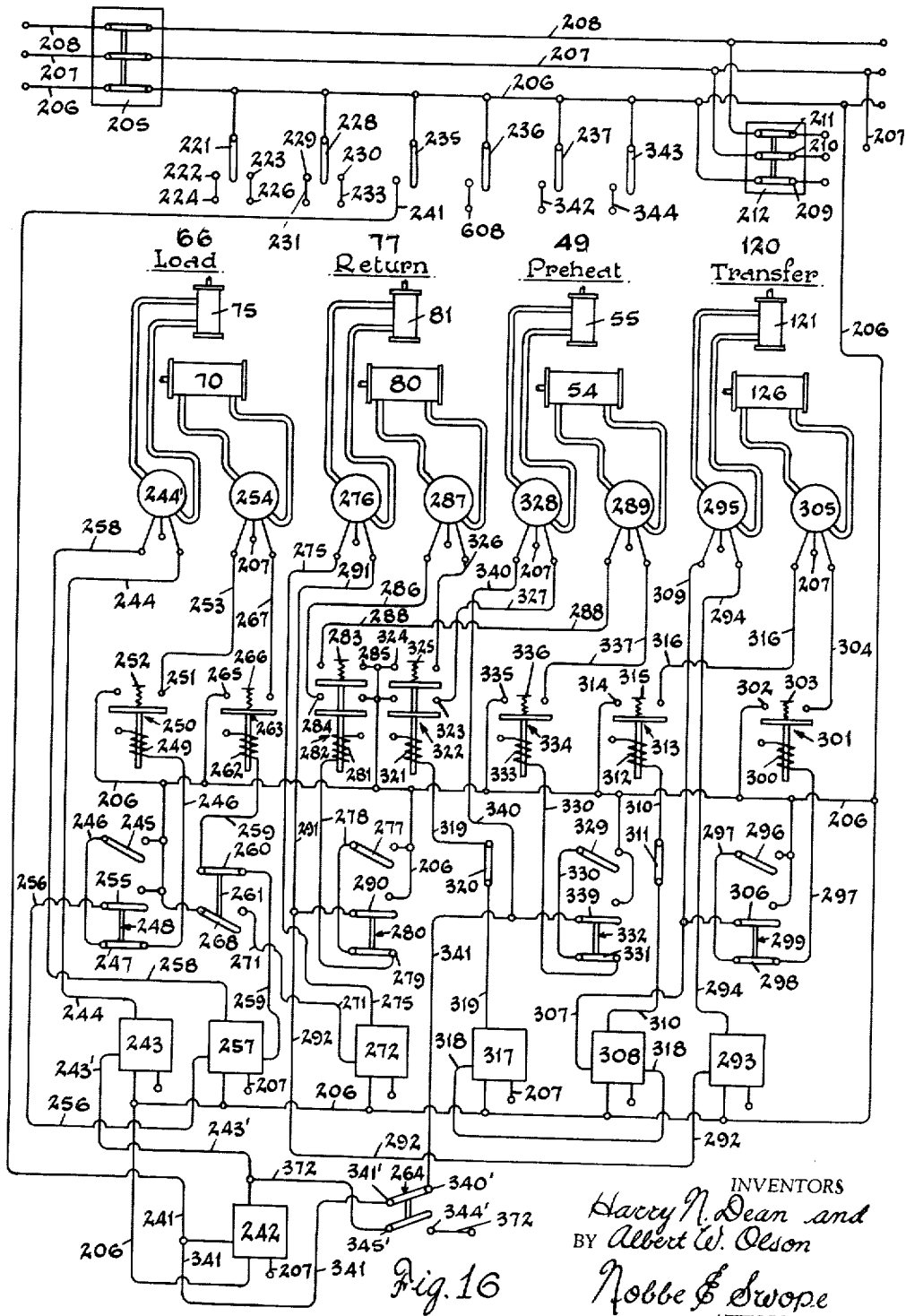

July 16, 1963 H. N. DEAN ETAL 3,097,943
APPARATUS FOR PRODUCING MULTIPLE GLASS SHEET GLAZING UNITS
Filed March 18, 1960 8 Sheets-Sheet 6

INVENTORS
Harry N. Dean and
BY Albert W. Olson
Nobbe & Swope
ATTORNEYS

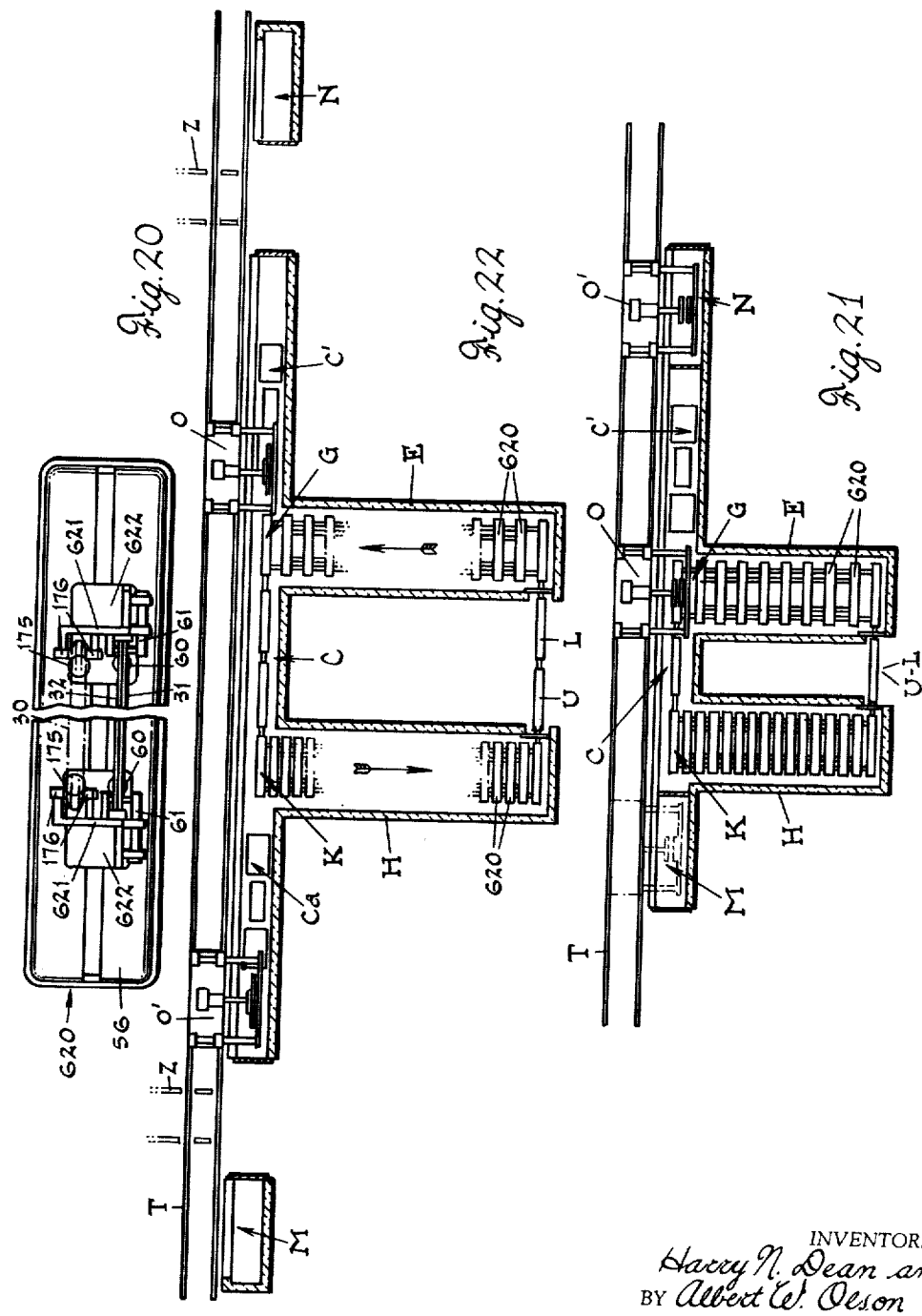

United States Patent Office 3,097,943
Patented July 16, 1963

3,097,943
APPARATUS FOR PRODUCING MULTIPLE GLASS SHEET GLAZING UNITS
Harry N. Dean, Waterville, and Albert W. Olson, Toledo, Ohio, assignors to Libbey-Owens-Ford Glass Company, Toledo, Ohio, a corporation of Ohio
Filed Mar. 18, 1960, Ser. No. 15,852
18 Claims. (Cl. 65—152)

This invention relates broadly to all-glass multiple sheet glazing units. More particularly, the invention is concerned with an improved method and apparatus for sealing together the peripheral edge portions of spaced sheets of glass to produce a hermetically-sealed glazing unit, the sides of which are formed by the continuous union of said edge portions.

Multiple sheet glazing units of the character to be herein described generally comprise at least two sheets of glass which have been sealed entirely around their edge portions in spaced face-to-face relation to provide a hermetically sealed dead air space therebetween.

An important object of this invention is to provide an improved method and apparatus for forming all-glass multiple sheet glazing units.

Another object of the invention is to provide such an improved method and apparatus which are readily adaptable to the production of all-glass multiple sheet glazing units of different sizes.

Another object of the invention is to provide an improved method of forming hermetically sealed multiple sheet glazing units in which the glass sheets are preheated, the peripheral edges thereof sealed, and the completed units cooled in a continuous manner.

Another object of the invention is to provide an improved method in which the preheating of the glass sheets, the sealing of the edges thereof, and the cooling of the completed units are sequentially and automatically performed without requiring manual handling of the glass.

A further object of the invention is to provide a novel apparatus for carrying out the method of this invention which is automatic in its operation and which performs the several steps of the method in timed relation to one another.

A further object of the invention is to provide such an apparatus including a furnace having a preheating section, a sealing section, and a cooling section, and means for moving the glass successively through said sections, together with interlocking controls for controlling the position of the glass in, and its passage through, said sections.

A still further object of the invention is to provide such an apparatus in which the sealing section contains a single sealing unit, and in which means is provided for supporting the sheets and for manipulating them in a manner to effect the sealing of all four edges of the sheets by said single sealing unit.

Other objects and advantages of the invention will become more apparent during the course of the following description, when read in connection with the accompanying drawings.

In the drawings, wherein like numerals are employed to designate like parts throughout the same:

FIG. 1 is a perspective view of an all-glass glazing unit produced in accordance with the present invention;

FIG. 2 is a sectional view of the glazing unit;

FIG. 3 is a plan view, in section, of an assembly apparatus, constructed in accordance with the invention;

FIG. 4 is a front elevation of the apparatus;

FIG. 5 is a vertical, longitudinal sectional view of the apparatus as taken on line 5—5 of FIG. 3;

FIG. 6 is a vertical, longitudinal sectional view of the apparatus as taken on line 6—6 of FIG. 3;

FIG. 7 is a plan view of one form of a support rack for glass sheets to be sealed together;

FIG. 8 is a fragmentary perspective view of a spacer member for the glass sheets;

FIG. 9 is a vertical, transverse section view of the apparatus as taken on line 9—9 of FIG. 6;

FIG. 10 is a vertical, transverse sectional view showing the sealing area of the apparatus and as taken on line 10—10 of FIG. 3;

FIG. 11 is a fragmentary horizontal or plan view of the sealing area of FIG. 10;

FIG. 12 is a vertical sectional detail view of a vacuum support means for the glass sheets;

FIG. 13 is a fragmentary elevational view of the vacuum support;

FIG. 14 is a fragmentary plan view of a support rack for completed glazing units;

FIG. 15 is a vertical, transverse sectional view of the apparatus as taken on line 15—15 of FIG. 3;

FIGS. 16, 17 and 18 are diagrammatic views of one form of control system for the apparatus of this invention;

FIG. 19 is a vertical, transverse view of a modified form of the apparatus shown in FIG. 15;

FIG. 20 is a plan view of a modified form of support rack;

FIG. 21 is a plan view of a modified construction of the sealing apparatus; and

FIG. 22 is a plan view of a second modified construction of the sealing apparatus for producing all-glass, multiple sheet glazing units.

Figure 17:
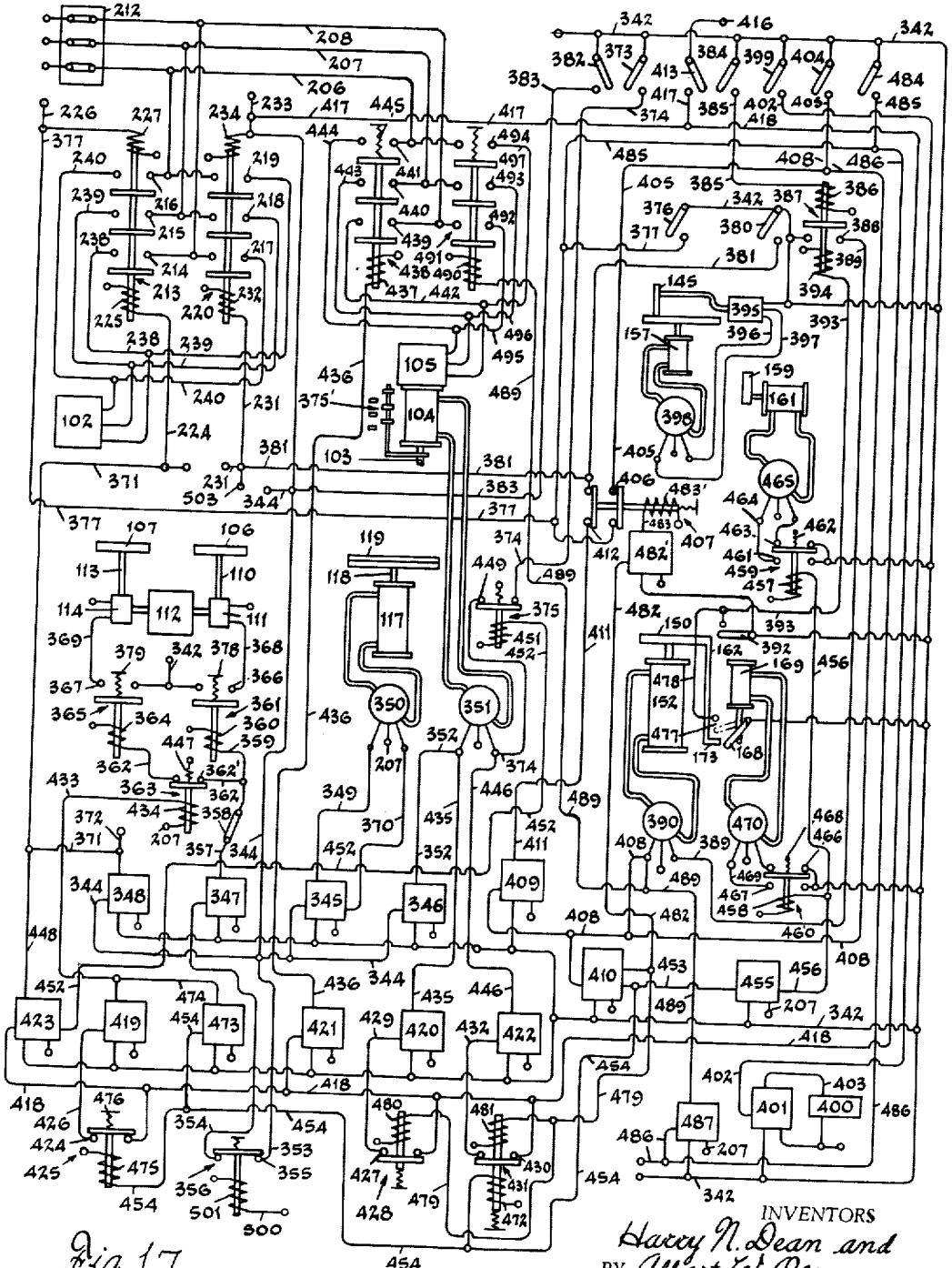

Briefly stated, the present invention contemplates the substantially continuous production of multiple sheet glazing units formed entirely of glass, means being provided for supporting two sheets of glass in vertically fixed and spaced relation and for moving the said sheets into and through an area of concentrated heat in order that the peripheral edge portions of the glass sheets will be integrally united to thereby create and seal off a dead air space therebetween. Further, means is provided for initially warming or preheating the glass sheets to an optimum working temperature and for ultimately cooling or annealing the completed glazing units until they are received at normal room temperatures.

Referring now more particularly to the drawings, there is shown in FIG. 1 an all-glass, multiple sheet glazing unit 30 produced in accordance with this invention and which as shown in FIG. 2 comprises two sheets of glass 31 and 32 spaced from one another by the edge wall portions 33 to create a hermetically-sealed, dead air space 34 therebetween. As indicated at 35, FIG. 2, by a dotted line, such a unit is conventionally provided with a so-called dehydration opening which, after the usual insertion of a dry air or gas, is suitably and substantially permanently sealed.

As will be seen in FIG. 3, the apparatus, by which a glazing unit of the above-described character is produced, is generally designated by the letter A and includes a preheating section B, a fusing section C and an annealing section D. Preferably, the preheating section B is formed by two tunnels E and F; the adjoining outer ends of which define a loading area L while the inner ends openly communicate with one end or transfer area G of the fusing or sealing section C. As will be more fully hereinafter set forth in detail, it is in this transfer area G that the suitably heated glass sheets are received on a carrier by means of which they are supported during the actual sealing operation.

Likewise, the annealing section D has two tunnels H and J whose outwardly disposed ends constitute an unloading area U and the inner ends thereof are in open communication with the opposite transfer end area K of the sealing section C.

The sealing section C comprises an enclosed chamber in which the sealing station C' is located between the transfer areas G and K. As above mentioned, in the transfer area G, the glass sheets 31 and 32 are positioned at the start of the sealing operation and, in like manner, the completed unit 30 is removed in the area K and gradually carried through the tunnel H wherein it slowly is cooled or annealed until the unloading area U is reached.

Also illustrated in FIG. 3, are end chambers M and N which communicate with the transfer areas G and K and constitute conditioning zones for the glass sheet carriers, generally designated by the letters O and O', preparatory to their introduction into the sealing section C. These carriers O and O' traverse a support means or track T that is disposed outwardly of and in parallel relation to one wall of the apparatus A.

Generally speaking and during normal operation of the apparatus, the carrier O can be moved from one terminus W of the support means T and into the conditioning chamber M and thence into operative position in the fusing or sealing section C. During this use of the carrier O, the similar carrier O' will be stationed in the oppositely disposed terminus X of the track T or in the conditioning chamber N. The purpose for utilizing two carriers in this manner is to maintain at least one carrier in service and equipped to handle one dimensional size of glass sheets and to provide a second carrier conditioned to assume the position of the first carrier or to quickly adapt the operation of the apparatus to the fabrication of a glazing unit of a differing dimensional size. Likewise, in the event of immediate repair, the carrier O is returned to the conditioning chamber M and thence into the terminal track area W where it can be easily approached and worked upon. During this normally expected interval, the carrier O' may be admitted into the sealing section C and positioned in the transfer area G where it will assume the operative functions of the carrier O. Thus, there is provided means for maintaining substantially continuous operation of the apparatus to carry out the method of this invention in the fabrication of all-glass, multiple sheet glazing units of differing dimensional sizes.

More practically described, the structure of apparatus A includes a suitably insulated wall structure generally designated by the numeral 36 and in which are located the several tunnels E, F, H and J, the sealing and transfer areas C, G and K and the conditioning chambers M and N. Thus, the tunnels E and F are enclosed by outwardly disposed side walls 37 and 38, an internally common wall 39, a common top wall 40 and a floor or bottom wall 41 (FIG. 5). In the case of the preheating tunnel E, the outer end thereof projects beyond the substantially open end of tunnel F and is closed by an end wall 42. Preferably, however, the open end of tunnel F is closed by a wall 43 having suitable apertures 44 formed therein (FIG. 4); this being desirable to prevent cooling, ambient air from entering the said tunnel and therefrom into the areas of the apparatus maintained at a necessarily controlled conditioning temperature. Suitable doors 45 (FIG. 9) are mounted in the projected portion 46 of wall 39 and are operable to seal the tunnel E except during admission of glass sheets therein. And, although not described or shown in detail, suitably mounted heating elements 47 are arranged in tunnel E to maintain the same at the desired working or preheating temperature.

The glass sheets 31 and 32 are supported and caused to be progressively advanced through the preheating section B by means of suitable carrier racks generally designated by the numeral 48. And to handle these racks in sequence, the sections of the apparatus are equipped with mechanisms conventionally known as "walking beams." Structurally, such devices are equipped at their upper ends with a support adapted to be raised and lowered and by means of rotatable supports at their lower ends to be moved horizontally. Thus, as shown diagrammatically in FIG. 9, a walking beam mechanism or conveyor 49 in the preheat tunnel E has a carriage 50 on which is movably carried upper rails 51 that are aligned with, and disposed inwardly of rails 52 fixedly mounted on pedestals 53 (FIG. 5), and adapted to support the racks 48. Generally speaking, the carriage 50 is moved by means of a cylinder 54 while the rails 51, vertically movable thereon, are operated by means of a cylinder indicated at 55.

As viewed in FIG. 9, the walking beam device 49 located in the tunnel E will be actuated to advance a series of the racks 48, loaded with glass sheets 31 and 32, from the loading area L to the transfer area G at the beginning of the sealing section C. From this area, the racks are carried to the inner end of the tunnel F and seqentially are advanced to the outer end thereof adjacent the said loading area L.

One form of rack generally designated by the numeral 48 and which has been used to advantage for the support and conveyance of glass sheets is illustrated in FIG. 7 wherein it will be seen to include an elongated base 56 and suitably spaced, vertically disposed uprights 57 that are adjustably secured to the base on the upper surface thereof. Preferably the uprights 57 are equally spaced from the median area of the base. More particularly, each upright is formed by a base pad 58 and a vertically disposed post 59. The base pad 58 carries a suitable support 60 on which the lower edges of glass sheets are mounted while the posts 59 are equipped with clamping devices 61 adapted to loosely receive the side edges of the glass sheets along their upper areas.

In the loading area L, a rack 48 is received on a fixed platform 62 which consists of spaced, horizontally disposed rails 63 carried by pedestals 64. Preferably, the track 62 is of sufficient length, as shown in FIG. 4 to substantially span the combined widths of tunnels E and F. Also, the ends of fixed rails 52 are rigidly connected to the adjacent surfaces of the rails 63 while notches 65 are provided therein for permitting movement of the walking beam rails 51 therethrough.

In order to convey a rack 48 from a position at the end of track 62, adjacent the end of tunnel F, to the opposite end thereof inside the tunnel E, at its entry end, a conveyor generally designated by the numeral 66 may be employed (FIG. 4). This conveyor has a carriage 67 equipped with casters 68 adapted to traverse rails 69. Motion of the conveyor 66 is provided by means of a horizontally disposed cylinder 70 through the piston rod 71 thereof. The carriage 67 supports a horizontally disposed bar 72 by means of links 73 and lever arms 74 pivotally associated therewith. These arms 74 are operatively connected to a cylinder 75 mounted on carriage 67 by means of a linkage indicated at 76. The bar 72 is provided with suitably notched areas that will be aligned with notches 65 in rails 63 at either end of movement of the conveyor 66.

Now, with a rack 48 located on the outwardly disposed end of platform 62, the clamping devices 61 are moved to an open position, a pair of glass sheets 31 and 32 are placed on the supports 60 and the clamps 61 again closed. The doors 45 at the entry end of the tunnel E are opened and the cylinder 75 is actuated by means to be hereinafter more fully described, to raise the bar 72 by means of the linkage 76, levers 74 and links 73. Vertical movement of the bar 72 is comparatively short but of sufficient magnitude to lift the loaded rack slightly above the surfaces of rails 63 between which the bar 72 is located. The cylinder 70 is now actuated to propel the conveyor 66 forwardly into tunnel E. When the rack 48 is suitably centered in the longitudinal axis of the tunnel and for the support rails 52 therein, cylinder 75 is reversed to lower the bar 72, thus depositing the loaded rack 48 again on the platform 62. Then, with bodily upward until the axial centers of the sheets are approximately aligned with the axes of the platens. At this instant, the platen 106 is slowly moved forward by the cylinder 104 and a control is actuated to operate valves 111 and 114 thereby opening the conduits 110 and 113 between the platens 106 and 107 and the source of vacuum 112. This operates to confine the sheets between the opposed surfaces of the platens and vacuously adhere the outer surfaces of the glass sheets thereagainst as a vacuum is created in the passageways 108. Substantially simultaneously another electrical control is activated to cause reversal of the cylinder 117 thereby lowering the elevator bracket 119. In timed relation, a further switch control activates the motor unit 102 to propel the carrier O forwardly from the transfer area G to an intermediate area, indicated by the letter Y, at which point, the carrier may be temporarily halted.

When the elevator bracket 119 has resumed its lowered position or is "at rest," a conveyor 120 is caused to remove the recently unloaded rack 48 from a position adjacent the innermost end of tunnel E to a second position adjacent the similarly disposed end of the tunnel F (FIG. 6). The conveyor 120, carries a cylinder 121 on the carriage 122 thereof and is movably supported by casters 123 on rails 124. Cylinder 121 is operably associated with horizontally disposed bar 125 to the end that when actuated, said bar will be moved upwardly between the rails 83 and lift the rack 48 therefrom. By means of cylinder 126, and the inter-related piston rod 127, the conveyor 120 will be caused to carry the rack 48 to a position of alignment, with the rails 79 of tunnel F.

In the repetitive actions of the walking beam structure 77 located in tunnel F, the rails 78 thereof in lowered position will enter notches 128 in rails 83 and will be raised to lift a rack 48 therefrom. Now, in so rising, the rails 78 will not only lift the rack on rails 83 but those rocks precedingly located on rails 79 so that in progressive sequences each rack will eventually reach the outer end of tunnel F and be again placed on rails 63 of platform 62 in position to be reloaded with glass sheets as at L. It may thus be said that the racks 48 move in a substantially closed path in the course of which movement they carry glass sheets through a preheating section and after the glass sheets have been removed, return to the situs of loading. And during these movements, the operations of the respective walking beam structures 49 and 77 and the conveyors 66 and 120 will be suitably associated by interlocking controls to provide for a substantially automatic manner of operation.

The carrier O, remains stationary at the transfer station G and then proceeds toward the zone indicated at Y for several important purposes; firstly, there may and probably will exist a differential between the thermal conditions of the glass sheets and the vacuum platens; secondly, slight physical distortion or warpage of the glass sheets may have been created during the preheating thereof or upon engagement with the platens; and, lastly, breaking of one or both of the glass sheets before or after they are received between the platens may occur for one reason or another. It will be appreciated that when the glass sheets are slowly heated they are substantially in total surface contact, thus when their outer surfaces are engaged by the vacuum platen there may be a tendency for the sheets to resist ready separation.

To off-set this tendency, one or more U-shaped clips or spacers 129 (FIG. 8) are employed and more or less loosely positioned on the upper edge of one of the sheets. Accordingly, one of the downwardly directed legs 130 of each clip will be interposed between the sheets, thus operating to slightly space the glass sheets apart along their upper margins to thereby facilitate their separation.

Accordingly, by leaving the sheets in surface contact and between the platens, a condition will gradually occur that may be conveniently termed "mellowing" and wherein the temperatures of the sheets and of the platens will approach an optimum of thermal balance and will easily and satisfactorily separate when the "movable platen 106 is slightly retracted.

In the second instance, when the sheets were described as being carried through the preheating section of the apparatus, it was stated that they were generally supported on a rack 48 at their lower edges and sustained by clamping devices in upwardly disposed areas. While some thermal warpage may arise when the glass sheets are heated, as the temperature therein approaches a range of 900° F., this tendency to warp tends to disappear and the sheets resume a flat condition. However, the differentials of temperatures existent in the sheets and in the platens may cause some slight warpage during the initial period that the sheets become associated therewith. Therefore, while the sheets are initially sustained between the platens by the pressure of the movable, outboard platen 106 acting to press the sheets against the fixed platen 107. As the temperatures of the glass sheets and the platens approach a balance, this warpage disappears so that the vacuous type of support can be applied to their central areas. And this may also influence tributary corrections outwardly toward their margins.

It might be mentioned at this point that it has been found preferable to treat the surfaces of the platens with a suitable composition qualified to produce a thin surface film on the surfaces which will operate to reduce, if not eliminate, oxidation of the platen surfaces which film is found to transfer onto the surfaces of the glass sheets until the platens have been in use for some time. Also the use of such surface films tends to "soften" the effect of contact of the hard metallic surface against the glass surface which presently is slightly plastic. This degree of contact, which may to some extent be controlled by the spaced distance between the opposed surfaces of the platens may cause "shadowy" impressions of the said surfaces into or onto the glass surfaces which will inevitably appar and destroy the optical clarity of the finished units.

In the last instance mentioned, when the mounted glass sheets are inspected before proceeding into actual sealing zone, it may be found that incipient vents, spalling or other unforeseeable defects have caused either one or the other of the glass sheets, or both, to have become cracked, broken or otherwise objectionably damaged. In this event, as the carrier O arrives in the zone Y, the valves 111 and 114 are closed thereby destroying the vacuous condition in and at the platens 106 and 107 and causing the glass sheets to drop freely therefrom. While only one sheet may have become damaged, both sheets are discarded since, of course, the carrier O will be returned to the area G to receive another pair of sheets 31 and 32. For the purpose of removing the sheets, a salvage pit 131 is provided in the floor 132 of the sealing section C and is normally closed by a trap door 133; the glass being easily removed by means of a scrap or cullet cart 134.

However, in the normally expected sequence of events and as the carrier O carries out its forward movement, the movable platen 106 is retracted a precise distance which is equal to the thickness of the air space to be established between the glass sheets 31 and 32. The sheets are then carried into the sealing station C' of the sealing section C and through an arrangement of fusion burners generally designated by the numeral 135. While the features of this form of burner arrangement form no part of the present invention, it may be said that they are typical of the fusing burners, disclosed in the patent to Eldwin C. Montgomery, No. 2,954,644, issued October 4, 1960, which is assigned to the same assignee as the present invention. According to the above-mentioned patent, heating or fusing burners 136 comprise a pair of manifolds 137 mounted on a base plate 138, each of said manifolds being equipped with a row of angularly disposed nozzles 139. The nozzles 139 serve to direct the flames therefrom in proper impinging relation upon the edge portions of the glass sheets 31 and 32, as they are carried forthe bar 72 in a lowered position, conveyor 66 is returned to the opposite end of platform 62 in position to receive an empty rack 48 thereabove. Subsequently the doors 45 are again closed.

After this course of events has been carried out, a similar conveyor or walking beam 77 in tunnel F by means of the associated rails 78 will have lifted the series of empty racks 48 from the fixedly mounted rails 79 and carried the said racks outwardly until the most outwardly disposed one of the series will have been carried through apertures 44 in tunnel wall 43 and positioned above the rails 63 of platform 62. The rails 78 are then lowered; it being understood that when one rack is deposited on the platform 62, the racks therebehind will be lowered onto the fixed rails 79 so that the rails 78 will pass therebeneath. For this purpose, conveyor 77 is operatively associated with a cylinder 80 while the rails 78 are caused to be moved vertically by means of a cylinder 81.

While not herein shown in detail, it will be appreciated that the ends or body of the conveyor 66 may be equipped with suitably formed shields to close the aperture in tunnel wall 39 through which the conveyor moves. Also, the carriages of the conveyors can be equipped with insulating baffles to protect the lower portions thereof from the heating sources.

One novel aspect of the present invention resides in the fact that the preheating section E may be relatively short in length; however, as will be more fully described in detail, since the actual sealing operation is entirely carried out at one so-called station or area the length of time during which the glass sheets traverse the tunnel E will be adequate to properly preheat the same. The purpose for this warming or preheating phase of the operation is, of course, to raise the glass from normal room temperature to such temperatures at which all strains therein are removed and a suitably semi-rigid condition is attained. By way of example, by means of heaters 47 the atmosphere of the tunnel E will be maintained at substantially 1000° F. or similar temperatures which will produce a heated condition in the glass sheets in the order of approximately 900° F. Thus, the intervals of time elapsing between the sequentially occurring movements of the loaded racks 48 and inwardly of the tunnel E will, in total, be commensurate with the actual length of time required to produce a glazing unit completely sealed around its peripheral edge portions.

Accordingly, each rack 48 entering one end of preheating tunnel E will, in regular order, eventually arrive at the transfer area designated by the letter G. This is accomplished by progressive lifting of the racks 48 from the fixed rails 52 by means of the associated walking beam conveyor 49, moving the racks forwardly thereby and again depositing the same onto the rails 52. Now, as a loaded rack 48 is removed from platform 62 at one end of the walking beam 49, a similarly loaded rack, but with properly heat-conditioned glass sheets, will be raised by the opposite ends of the rails 51 of said beam; carried forwardly and then deposited on the rails 83 of a platform 84. As viewed in FIGS. 6 and 9, this particular rack 48 will then be positioned for transfer of the heated glass sheets thereon to a carrier O.

The particular structure of the carrier O, and as herein disclosed as in FIG. 11, includes a frame 85 comprised of a platform 86, horizontally disposed bars 87 and a support beam 88 at the ends thereof. Although not shown in specific detail, it may be said that the platform 86 is carried by means of casters or wheels 89 on the horizontally disposed and spaced rails 90 of the aforementioned track T. The rails 90 may be adequately mounted on a structural framework 91 that is located outwardly of and parallel to the "rear" wall 92 of the enclosing wall structure 36. The bars 87 are fixedly mounted by brackets 93 substantially at the opposite ends of the platform 86 and project through the wall 92 by way of a slot 94 provided therein. Actually the slot 94 is formed to extend from the outer or end wall 95 of conditioning chamber M to the like outer or end wall 96 of the conditioning chamber N; each of these walls 95 and 96 being equipped with closure doors or panels 97 or 98 respectively. Likewise, the ends of chambers M and N communicating with the sealing section C are provided with doors 99 and 100. To substantially eliminate heat loss from either of the chambers M and N or the sealing section C generally, a flexible curtain 101 in the form of suspended metal bead chains is provided; the individual lengths of chain being closely related and operable to freely slide over the bars 87 and drop into place again as the carrier O moves in one direction or the other by means of a reversible type motorized unit 102 mounted on the platform 86.

Medially mounted on the platform 86, in its transverse axis, is a hollow shaft 103 which by the manner of its support at one end is adapted to be reciprocally moved by means of a cylinder 104 and to be rotated in either direction by means of a suitable indexing unit 105. The outer or opposite end of shaft 103 mounts one (106) of a pair of vacuum platens, the other platen 107 being fixedly mounted on the beam 88. As shown in FIGS. 12 and 13, the surfaces of platens 106 and 107, normally in facing opposition to one another, are provided with interconnecting grooves 108 which afford a circuitous passageway that is associated with a centrally disposed opening 109. In the case of the platen 106, this opening 109 is connected by conduit 110 disposed in the hollow shaft 103, and through valve 111, to a vacuum source 112. Likewise, platen 107 is connected by conduit 113 with the source 112 through valve 114. The necessary controls for the motor unit 102, the cylinder 104, motor unit 105 and valves 111 and 114, inter alia, may be contained in a panel box 115 carried by the platform 86.

The vacuum platens for purposes of simplicity may be defined as the "movable" platen 106 on the shaft 103 while the platen 107 on beam 88 may be similarly designated as the "fixed" platen. Both are of equal rectangular outline, circular or suitably otherwise shaped and as herein shown are generally rectangular with their length and width being dimensionally less than the length and width of the glass sheets to be worked upon.

In starting a production cycle, a carrier, such as carrier O, is positioned on the track terminal W and moved therefrom, upon opening of the panel 97, into the conditioning chamber M after which the panel is closed. Here the platens 106 and 107, particularly, are subjected to the influence of a heated atmosphere, by means of heating sources indicated at 116 until they have attained a heat substantially at the temperature at which the glass sheets are delivered into the sealing section C at transfer area G. This is, of course, to prevent thermal shock and consequent undesired glass breakage. However, during normal production, the carrier O will nominally remain within the working area of the section C and the vacuum platens carried thereon will retain a heated condition.

From the disclosure of FIGS. 9 and 10, it will become apparent that the elevation of the slot 94, or the plane of the horizontal path traversed by the carrier O, is considerably above the planes in which the racks 48 are moved through either of the tunels E or F. Accordingly, when a loaded rack 48 is situated, as shown in FIG. 9, it becomes necessary to raise the sheets between and relative to the vacuum platens 106 and 107 which are at this time maintained in spaced relation. For this purpose, a cylinder 117 is axially located in a vertical plane coincident with the medial line of the rack 48 and the aligned axes of the platens. The piston rod 118 of this cylinder carries an elevator bracket 119 that is adapted to be passed upwardly between the rails 83 of platform 84 and in so doing engage the rack 48 to lift the same, with the glass sheets thereon, and to carry them wardly, to heat the said edge portions to the proper temperature. The nozzles are connected in common to a suitable valve to receive an oxygen and natural gas mixture or other suitable mixtures.

After the edge portions of the glass sheets are carried through the flames from nozzles 139 and are progressively heated to a desired temperature, as for example, within a range of 1800° F. to 2000° F., they pass between and into contact with a pair of forming or shaping rolls 140 whereby the softened edge portions are merged integrally together and simultaneously the desired curvature of or shape of the sealed edge or the side wall 33 of the multiple sheet glazing unit 30 will be formed.

Since the shaping of the side wall 33 is effected by the action of rolls 140 on the softened, and highly heated glass, it is highly desirable to remove any and all roll marks and scratches from the outer glass surfaces by passing the formed side wall through a second burner area 141 to achieve a satisfactory "fire-polish" finish. Accordingly, a pair of manifolds 142 equipped with nozzles 143 are mounted on the base plate 138 beyond the forming rolls 140. Also, positioned between the fusing burners 136 and the rolls 140 is a feeder device 144 which is adapted to insert a small metal tube or grommet between the edge portions of the glass sheets immediately before they pass between the rolls 140. This tube is located adjacent to one corner of the side walls 33 and as aforementioned provides an opening, as at 35, FIG. 2, through which the completed glazing unit is dehydrated and which is subsequently sealed. Usually only one such opening is provided in each unit so that operation of the feeder device 144 is not concurrent with the sealing of each side of the unit but is only activated while one, and preferably the first, of the side walls 33 is being heated and formed.

As described and claimed in the above-mentioned patent to Montgomery No. 2,954,644, a control is provided for automatically positioning the burners in advance of passage of the edge portions of the glass sheets through the burners 136. Briefly stated, this control includes an indicator device, herein indicated by the numeral 145, that is affected by the plane or elevation in which the edge portions of the sheets are moved. In one way or another, this control causes the base plate 138 to be raised or lowered and thereby establish a desired width of marginal area of the edge portions of each sheet that will be subjected to the flames from burners 136.

As shown in FIGS. 10 and 11, the chamber of the sealing section C is enclosed by the rear wall 92, floor 132, a front wall 146 and a ceiling or roof 147. This area of the apparatus in which the temperature is exceedingly critical is heated by suitable elements which by way of example are indicated at 148. Also, for accommodation of the fusion burner arrangement 135 as it is elevated or lowered, the floor 132 is equipped with an opening 149. As shown in FIG. 10, a mounting structure for the burners is provided in the form of a framework 150 that is generally carried at the upper end of the piston rod 151 of a vertically disposed cylinder 152.

The framework 150 includes a horizontally disposed base 153 and an upper platform 154. The burner base 138 is generally supported on this platform. The platform 154 is supported on the base 153 by suitable posts 155 while the base 138 is fixedly attached to a bracket 156 carried actively by a vertically disposed cylinder 157 mounted on a frame 158 in turn carried by a movable base 159. The base 159 is equipped with casters 160 by means of which said base, frame 158 and cylinder 157 are laterally movable with respect to the base 153. The frame 158 and base 159 are operably attached to a cylinder 161 that is mounted on the base 153.

As seen in FIGS. 6 and 10, the framework 150 may be equipped with downwardly directed guide rods 162 that pass through suitable bushings mounted in a bracket 163 secured to the upper end of the cylinder 152.

As will be more fully described in connection with FIG. 17, several purposes are accomplished by mounting the framework 150 bodily on the cylinder 152; the frame 158 on the base 153 and the base plate 138 in movable relation to the cylinder 157. Initially and as aforementioned, the burner arrangement 135 is preferably raised and lowered between the successive sealing steps. This is accomplished by action of the cylinder 152. When raised to a desired upper position, a final positioning of the burner arrangement is obtained when the leading corners of the glass sheets 31 and 32 pass between the device 145 which, in one way or another, causes actuation of the cylinder 157. This will operate to raise or lower the base plate 138 and accordingly properly locate the burners 136, the forming rolls 140 and the burners 141 in relation to the edge portions of the sides of the glass sheets to be acted upon.

In order to adequately seal the opening 149 against ingress of cooling air into the sealing section of the apparatus, the framework 150 may be equipped with panels 164 that are arranged to form a box-like enclosure adapted to move in sliding relation to the walls of the said opening. Also, an inspection and viewing window may be provided by means of a door 165 equipped with a glazed opening and hingedly mounted on the front wall 146 of the sealing section.

According to one satisfactory method of fabricating the sheets 31 and 32 into a sealed glazing unit and when the sheets are to be spaced from one another, the sheet 32 on platen 106 is moved outwardly as by means of the cylinder 104 a predetermined distance which will establish the thickness of the dead air space to be created between the sheets. In this spaced relation, the sheets are carried toward the fusion burners 136 and the platform 138 is automatically elevated by means of the cylinders 152 and 157 into a plane which has been determined to subject the necessary width of the sheets' marginal edge portions to the flames from the burners. Such an automatic system of elevation is a part of a general control by means of which the burners 136 and 141 will be repetitively moved between a lower inoperative position and an upwardly disposed operative position.

One form of control, as diagrammatically shown in FIG. 17, may be used to advantage in the apparatus of this invention since upon complete fusion and fire-polishing of the edge portions of one side of the glass sheets, the carrier O is sequentially moved rearwardly pending the next succeeding fusion step. Briefly stated, one form of sealing may involve the sealing together of the glass sheets along one of their complementary sides; rotation of the sheets through substantially a half-circle or 180° and sealing of a second or oppositely disposed side of the sheets. This manner of operation has been found preferable in most instances since upon completion of the second fusing step, the oppositely disposed sides, or the edge portions thereof, will be integrally united and the thickness of the aforementioned air space 34 definitely established. Preferably, also, the first and second fusion steps are ordinarily carried out along the sides of longest dimension. This serves two purposes simultaneously in that by uniting the two sheets along the sides of greatest dimension they can later be handled with more stability as a partially completed unit and as a consequence the sheets can be supported vacuously on the surface of one sheet only. This reduces, if not completely eliminates, any possibility of the oppositely disposed outer surfaces being scratched or otherwise marred.

Thus, the carrier O moves the sheets 31 and 32 through the fusing and polishing burners 136 and 141, and, when the following corner of the sheets has passed beyond the sealing station C', said carrier is halted. By some form of aforementioned control, and which will hereinafter be more fully described, when the carrier temporarily stops, the platform or base plate 138 and framework 150 generally are lowered by the cylinder 152 to position the burners 136 and 141 beneath the plane in which the sealed edge portions have been moved. The pressure of the gas mixture to the burners may also be decreased or temporarily shut off. The carrier O, in returning to a starting position as at the zone Y, thus moves rearwardly over and beyond the sealing station C'.

Now, the valve 114, connecting platen 107 to the vacuum source 112 by conduit 113, is closed thereby releasing the adjacent glass sheet 31 from vacuous engagement therewith. The cylinder 104 now retracts the shaft 103 and platen 106 to separate the sheet 31 from contact with the platen 107 after which the motorized indexing unit 105 is operated to turn the said shaft approximately 180°. When the sheets are arranged in this second position, the platen 106 is advanced by the cylinder 104 until the sheet 31 is again in surface contact with the platen 107. The valve 114 is then reopened to establish a vacuous condition in the passageway 108 of platen 107 and the motor 102 becomes operative to drive the carrier O forwardly. As the sheets approach the fusion burners 136 a second time, the base plate 138 is elevated by the cylinders 152 and 157 and the burners 136 and 141 are simultaneously ignited or the gas pressures thereto are increased.

When the following corner of the sheets 31 and 32 again passes beyond the burners 135 a second time, the carrier O is again halted; the gas pressures are reduced; the framework 150 is lowered by cylinder 152 and in timed relation, the motor 102 of the carrier O is reversely operated to return the same to the area Y. In repeating order, the motor 102 is halted. Preparatory to sealing of the edge portions of the third sides of the sheets, the valve 114 is closed to release the sheet 31 of the now partially completed unit from the influence of vacuum at the platen 107 which enables the platen 106 by cylinder 104 to carry said partial unit away from the fixed platen 107. In this newly established spaced relation, the shaft 103 is caused to rotate the sheets by means of the indexing unit 105 which is now controlled to produce only a rotation of 90°. According to operating procedures, this will position one of the sides of shorter dimension or of sheet width, in a lower horizontal plane of movement.

It will also be understood that the partially joined sheets are now carried solely by the platen 106 and that the vertical plane in which they are carried forwardly has been shifted from the original plane of movement by reason of the fact that the platen 106 has been retracted in its relation to the platen 107. It thus becomes apparent that in being properly positioned for accurate passage of the sheets between the burners 136, and the rolls 140 and fire-polishing burners 141, the burner arrangement 135 must be bodily shifted laterally in agreement with the plane into which the sheets have been repositioned. Thus, as the leading edges of the sheets approach the fusing area, correction of the burners' position must be automatically carried out so that the flames will be equally effective on the margin of each sheet of glass and no irregularity of flame or the formation between the rolls 140 will exist to either subject undesired portions of either sheet to the excessively high temperature required for the fusing operation or defectively roll the heated edge portions to form a side wall 33.

For this purpose, the base plate 138 is mounted by means of the frame 158 that is carried by frame 159 and casters 160 on platform 153 and operatively associated with cylinder 161. The frame 159 being fixedly attached to the end of piston rod 166 of the horizontally disposed cylinder 161 accordingly will be caused to carry the frame 158 laterally and thereby shift the burner arrangement 135 into alignment with the path traversed by the glass sheets during the third sealing step. This manner of substantially automatic adjustment permits the required movements of the burners within the sealing area and adequate protection of the actuating elements therefor outside of the heated area.

In the event that the glass sheets are other than square, when the carrier O is moved a third time toward the burners 135, the plane of the elevation to which they are moved upwardly will be equally lower as indicated by the letter a in FIG. 10, than the plane, indicated at b, FIG. 10, into which they were moved to carry out the first and second fusing steps. To control the shortened stroke of the piston rod 151 of cylinder 152, a simplified device is illustrated at 167 in FIG. 10 which includes a lever 168 that is operated by means of a cylinder 169; said cylinder being mounted on a bracket 170. Before the carrier O begins the third sealing step, the cylinder 169 is automatically operated to raise the lever 168 by an arm 171 carried by the piston rod 172. This will swing said lever upwardly to a position indicated by the letter c in which the end of the lever 168 is located so as to be engaged by a collar 173 carried by one of rods 162 depending from the base 153. This motion of the lever 168 operates to generally stop the burners 135 at the level indicated by the line a. Thus, the burners 136 and 141 and the forming rolls 140 therebetween will automatically be positioned both vertically and laterally or horizontally to effect the sealing operation of the edge portions of the third sides of the glass sheets. This third step is followed by the stoppage of the carrier O beyond the sealing area; lowering the burners 135 and return of the carrier to the zone Y.

The fourth sealing step is initiated by rotation of the platen 106 and sheets mounted thereon through an arc of 180° and is then carried out in the same manner as previously described in connection with the third step. Upon completion of this fourth fusion step or the complete sealing of the glass sheets around their peripheries to form an all-glass multiple sheet glazing unit, the carrier O is moved forwardly from the sealing station C' to the open transfer area K and the motorized indexing unit 105 is operatively connected again to rotate the completed unit, if desired, a final turn of 90° to locate the initially sealed edge portions at the bottom of the unit. Thus, when the completed unit 30 has been advanced to the area K, it is positioned for removal onto a rack 174 and by means of which it will be progressively carried through the tunnel H of the annealing section D.

As viewed in FIG. 14, it will be seen that rack 174 is structurally identical to the rack 48; the essential difference being in the provision of suitable supports or rollers, generally designated by the numerals 175 and 176 that support the unit in a vertical position and sustain the same without scratching or otherwise marring the surfaces thereof. Likewise, a platform indicated at 177 in FIGS. 3 and 6, is disposed in similar position to the previously described platform 84 while an elevator bracket 178, identical to the bracket 119, is operated by the cylinder 179 in substantially the same manner.

Thus, when a unit 30 is to be transferred from the carrier O to a rack 174, said rack is raised from the platform 177 and carried upwardly until the lower side wall of the unit is engaged by the supports 175 and the vertically disposed margins of the glazing unit are received between rollers 176. Valve 111, when closed, breaks the vacuum to platen 106 so that upon reversal of action of the cylinder 179, the elevator bracket 178 carried thereby will lower the rack 174 until it is again supported on the rails 180 of platform 177. The carrier O is now adapted to be returned to the area G and in position to receive a subsequent pair of glass sheets 31 and 32 between the platens 106 and 107.

The tunnels H and J of the annealing section D are equipped, similarly to the tunnels E and F, with walking beams or conveyor devices, generally indicated by the numerals 181 and 182 in FIG. 15; however, in the present instance, the vertically movable rails 183 of walking beam 181 in tunnel H operate to advance the complete glazing units forwardly to the unloading area U while, in timed relation, the rails 184 of the similar walking beam device 182 in tunnel J operate to sequentially return empty racks 174 to the transfer area K.

Accordingly, when a rack 174, carrying a completed unit 30 has been deposited on the platform 177, the rails 183 of the beam device 181 are raised by means of a cylinder 185 and the carriage 186 then moved forwardly by means of a cylinder 187 to position the immediate rack in the entry area of the annealing section and simultaneously advance a similar rack 174 onto the rails 188 of platform 189 at the outwardly disposed end of tunnel H. The beam rails 183 are then lowered, which will place the loaded rack 174, together with those preceding it on the fixed rails 190 extending through the tunnel H and secured at their opposite ends to the rails 180 and 188 of the platforms 177 and 189 respectively; suitable support pedestals being disposed therebetween.

Substantially simultaneously, the walking beam or conveyor 182 in the unnnel J will be caused to move by means of an associated cylinder 191 to carry the movablbe rails 184, in their lowered position, forwardly until the outer ends thereof are situated in suitably notched areas of the platform 189 and beneath a recently unloaded rack 174 thereon. With the rails 183 of conveyor 181 and rails 184 of conveyor 182 thus located at the outermost limit of their movement, a conveyor 192 (FIG. 6), similar in construction to conveyor 120, is caused to carry an empty rack 174 from the end of platform 177, adjoining the inner end of tunnel J, to the opposite end thereof in the transfer area K. For this purpose, the bar 193 of conveyor 192 is elevated by cylinder 194 to lift the rack; after which a cylinder 195 is actuated to propel the conveyor laterally. Upon reversal of the cylinders 194 and 195 in sequential order, the rack is lowered onto the rails of platform 177 and the conveyor 192 is moved rearwardly from the tunnel H to the tunnel J with the bar 193 in its lowered position.

Now, the cylinders 187 and 191 are actuated to move their respective conveyors 181 and 182 inwardly so that the innermost ends of the associated rails 183 and 184 will again be in registry with the platform 177. However, while the cylinder 185 remains inactive during these movements, the cylinder 196 associated with the movable rails 184 of conveyor 182 will be made effective to raise the same thereby removing the empty rack 174 from the platform 189 and eventually depositing the most inwardly situated empty rack 174 on the platform 177 as the rails 184 are lowered upon reversal of the cylinder 196.

Thus, as shown in FIG. 4, while this sequence of events is being carried out, a conveyor 200, similar to the conveyors 66 and 120, as previously described, is stationarily positioned in the section of platform 189 located in the outer end of the tunnel H. Consequently, when the ends of rails 183 have carried a loaded rack 174 onto the platform 189, they will pass through and eventually descend into notches formed in the associated rails 188 before coming to a halt. This will concurrently remove the opposite ends of the rails 183 from similar notches in the aforementioned platform 177. Now, when the rails 183 deposit a rack 174 on the platform 189 within the outer or exit end of the annealing tunnel H, the conveyors 181 and 182 will be caused to again move rearwardly to dispose the rails 183 and 184 thereof in registry with the platform 177. During this action, the cylinder 196 is operated to raise the rails 184 and accordingly lift a recently emptied rack 174 from the outer end of platform 189 preparatory to movement of the walking beam or conveyor 183. Likewise when this particular rack 174 is lifted, those preceding it in the return tunnel J will be lifted as well from the fixed rails 201 therein. Upon arrival of conveyor 184 at the innermost limit of its movement, the cylinder 196 is automatically reversed to lower associated rails 184 which will place one rack 174 on the adjacent end of the platform 177 and those therebehind on the rails 201.

With the respective rails 183 and 184 removed from platform 189, the conveyor 200 can be caused to remove a fully annealed glazing unit 30 from within the tunnel H and to convey the same to the opposite end of the platform where the unit can be unloaded for initial inspection and ultimate dehydration before being hermetically sealed. For this purpose, the conveyor 200 is equipped with a lift bar 202, that is vertically raised and lowered by means of a cylinder 203, and is operably associated with a cylinder 204 adapted to cause the reciprocal motions thereof. Consequently the bar 202 is adapted to lift and carry a loaded rack 174 from the outer end of annealing tunnel H to the adjoining end of the return tunnel J and to then lower the same onto the platform 189. The conveyor 200, by reversal of cylinder 204, then is returned to the opposite ened of platform 189 within tunnel H, where it is halted.

It is now believed quite apparent that the production of all-glass multiple sheet glazing units is adapted, by means of an apparatus as herein disclosed, to be automatically carried out. More than this, by reason of the relatively compact arrangement of the functioning elements, the apparatus per se will be adapted to installation in a considerably smaller area and likewise is adapted to be rapidly adjusted for the production of glazing units having differing dimensions.

By means of this novel apparatus, it also becomes possible to continue the production of one size of unit while preparing a carrier, such as the carrier O' for the production of another size of unit. Equally true is the fact that in the event of necessary repairs to one carrier, the other is instantly conditioned for carrying on the required production without an interruption or "down-time." Thus, in the event that adjustments or repairs of the carrier O become necessary, the door or closure panel 99 is opened and the carrier is returned from the vicinity of the transfer area G into the conditioning chamber M and therefrom through the aperture of panel 97 onto the terminus area W of the track T. The carrier O' can now be propelled from the chamber N, across the transfer area K, the fusing area and until it is halted in the transfer area G at which point it is adapted to receive a pair of glass sheets between the vacuum platens thereof. Accordingly, no interruption in production will be created and the substituted carrier O' will perform the normal sealing cycles while the carrier O is located in an area of easy accessibility.

Figure 18:
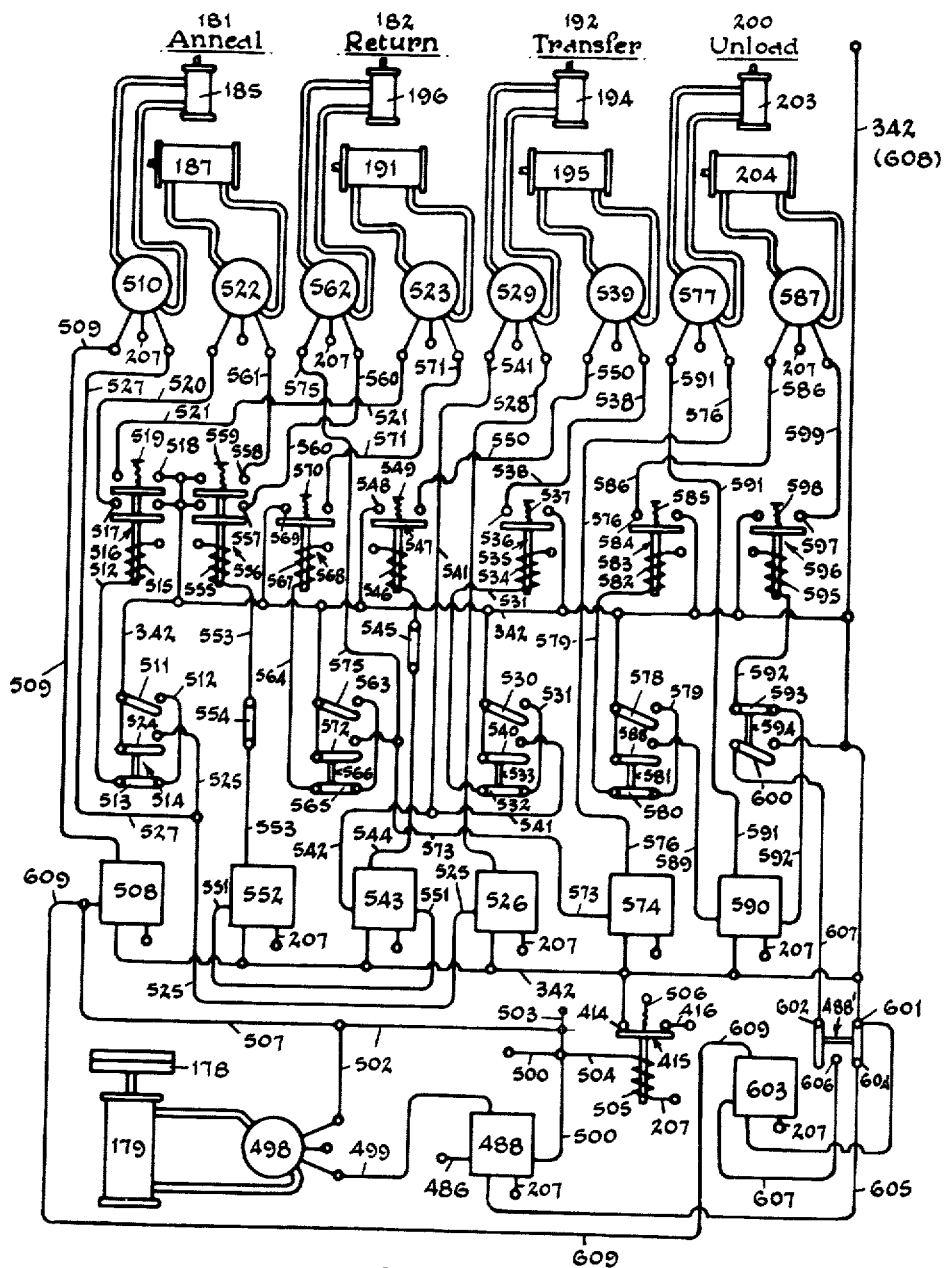

In order that the cycles of operation can be followed in a simplified manner through the sequences of requisite and substantially automatic functioning of the apparatus and to illustrate the utility of the necessary switches and valves, reference is now made to FIGS. 16, 17 and 18 wherein an examplary form of electrical circuits and control systems has been combined in diagrammatic representation. A predeterminedly timed sequence for each cycle or the inter-related steps of each cycle is, of course, controlled by suitable timing relay devices. However, since the preparatory movements of the carrier O, or the carrier O' are of primary importance, attention first is directed to individual controls by means of which one carrier or the other is removed from their respective track terminus, W or X, and into the conditioning chambers, M or N, or from these conditioning chambers into the actual sealing or fusing section C.

In the case of the carrier O, as herein disclosed, it is adapted to be moved directly from the conditioning chamber M to the transfer area G at the entry end of the section C. On the other hand, the carrier O' requires to be moved from the conditioning chamber N, through the transfer area K and fusing area before it arrives at the initial transfer area G. Likewise, it is believed apparent that before the actual sealing operation, a plurality of pairs of glass sheets must be properly conditioned in the preheat section B and moved in timed sequence toward the transfer area G and ultimately upon completion of a production "run" of double glazed units, the same must be carried through the annealing section D before this section can be rendered idle.

Accordingly, for purposes of illustration, the required circuiting for the preheat section B is set forth in FIG. 16; the circuits for the actual sealing operation in FIG. 17; the circuits for the annealing section D in FIG. 18, it being appreciated that from time to time reference must be made to one figure or the other in order that the sequences of operation can be described individually or in combination as during a complete sealing cycle.

Accordingly, as seen in FIG. 16, a master control switch 205 completes the lines 206, 207 and 208 to one side of pairs of contacts 209, 210 and 211 of a control switch 212 and therethrough to a related relay switch 213, equipped with pairs of contacts 214, 215 and 216, and which controls forward motion of the carrier O by motor 102; that is to say, from the transfer area G to the opposite transfer area K, (FIG. 3). Lines 206, 207 and 208 may also extend to a similar switch (not shown) for the motor associated with the carrier O'. Lines 206, 207 and 208 are also connected to pairs of contacts 217, 218 and 219 of relay switch 220 which controls the rearward motion of the carrier O. Line 206 further is connected to a manually operable switch 221 having contacts 222 and 223. Switch 221 is adapted at contact 222 to complete a circuit from source line 206 through line 224 to the solenoid 225 of relay switch 213 (FIG. 17) and thence to source line 207. On the other hand, contact 223 will complete a circuit from source line 206 by line 226 to the opposed solenoid 227 of switch 213. Likewise, a manual switch 228, having contacts 229 and 230, is adapted to complete a circuit through contact 229 and line 231 to the solenoid 232 of relay switch 220 (FIG. 17) while, at contact 230, a circuit through line 233 may be completed to an opposed solenoid 234 of the switch. Similar switches (not shown) may be employed for manually controlling operation of the motor of carrier O'. Source line 206 additionally is connected to manual switches 235, 236 and 237; switch 235 being adapted to control individual operation of the associated conveyors of the preheat section B; the switch 236 to control the individual operation of the like conveyors of the annealing section D and the switch 237 to control the automatically occurring sequential steps of the sealing cycle, all of which will be hereinafter more fully described.

Now, in starting the operation of the sealing apparatus and with the switch 205 (FIG. 16) in the closed position, manual switch 221 is operated to complete a circuit through line 224 to the solenoid 225 of relay switch 213 (FIG. 17) which will cause the pairs of contacts 214, 215 and 216 to complete circuits through lines 238, 239 and 240 to the motor 102 of carrier O until the same has been moved from the outwardly disposed track terminus W until the platens 106 and 107 mounted thereon are positioned in the conditioning chamber M for the purpose of heating said platens to a temperature approximating that of the glass sheets 31 and 32 as they approach the transfer area G. When the platens are so positioned in chamber M, switch 221 is reversed to complete a circuit from source 206 and line 226 to the solenoid 227 of relay switch 213 and thence to source line 207 thereby opening the pairs of contacts 214, 215 and 216 to halt the motor 102.

With a rack 48 at the loading end of platform 62 at the entrance of the preheat tunnel E and with a pair of glass sheets 31 and 32 mounted on the rack, the manual switch 235 is employed momentarily to complete a circuit from source line 206 and by line 241 to a timer 242, said timer being in circuit with source lines 206 and 207. This timer is adapted to cause the automatic repetition of cycles about to be described and by means of which the racks 48 are circuitously moved through the preheating section B. Timer 242 for this purpose initiates the action of a timing relay 243 by line 243', said timer being in circuit with lines 206 and 207. Timer 243 by line 244 is connected to one side of a valve 244' associated with the cylinder 75 and operates to raise the bar 72 and lift the rack 48 from the rails of platform 62. By means of a limit switch 245, carried on the conveyor 66, a circuit from source line 206 is completed by line 246 through the normally closed contacts 247 of switch 248 to the solenoid 249 of a relay switch 250 and thence to source line 207. Contacts 251 of the switch when engaged, against bias of spring 252, complete a circuit from source line 206 by line 253 to a valve 254 and thence to source 207. Valve 254 is associated with cylinder 70 whereby the conveyor 66 will be operated to carry the supported rack 48 into the entry end of the preheat tunnel E and to the opposite end of platform 62.

At this point, the contacts 247 of switch 248 are opened to de-energize the solenoid 249 and simultaneously contacts 255 are closed to complete a circuit from source line 206 by line 256 to a timing relay 257, said timer being in circuit with source lines 206 and 207. This timer, when activated, is adapted to lower the rack 48 onto the rails 63 of platform 62 and then cause movement of the conveyor 66 outwardly of the tunnel E and again to the loading end of said platform adjoining the outer end of the return tunnel F. For this purpose the timer 257 by line 258 is adapted to reverse the valve 244' and consequently cause cylinder 75 to lower the bar 72 and rack 48 thereon; this action also causing the opening of switch contacts 245. Timer 257, after a delay interval, then completes a circuit from the source line 206 by line 259 through the normally closed contacts 260 of a limit switch 261 to the solenoid 262 of relay switch 263. At this time, the manually operable switch 235 is opened and a manual switch 264 is closed for reasons to be hereinafter more fully explained.

The pair of contacts 265 of switch 263, against action of spring 266, complete a circuit from source line 206 by line 267 to the valve 254 and then to source line 207. This operates to reverse the pressure in cylinder 70 and consequently cause movement of the conveyor 66 outwardly from the preheat tunnel E whereupon contacts 255 of switch 248 are opened and the contacts 247 are reclosed. Now, when this conveyor reaches the loading end of platform 62, the limit switch 261 is reversed to open the contacts 260 and close contacts 268 thereof and complete a circuit from source line 206 and by line 271 to a timer 272.

When the timer 272 is activated, a line 275 completes a circuit from source line 206 to valve 276 and thence to source 207. Valve 276 is associated with the cylinder 81 which is adapted to raise the rails 78 of the walking beam or conveyor 77 and thereby lift the plurality of empty racks 48 from the fixed rails 79. A limit switch 277, mounted on the structure of conveyor 77, then completes a circuit from source line 206 by line 278 through the normally closed contacts 279 of limit switch 280 to the solenoid 281 of a relay switch 282 and thence to source line 207. This switch, against spring 283, closes pairs of contacts 284 and 285. Contacts 284 complete a circuit by line 286 to a valve 287 and thence to source line 207; this valve being associated with cylinder 80 by means of which the conveyor 77 is caused to move the rails 78 thereof outwardly toward the platform 62 until the outermost empty rack 48 is positioned thereabove. Likewise, contacts 285 by line 288 complete a circuit from source line 206 to a valve 289 associated with the cylinder 54 and thence to source line 207. Cylinder 54 causes the walking beam or conveyor 49 to carry the beams 51 in a lowered position toward the entry end of the preheating tunnel E. Upon reaching this location, conveyor 49 causes opening of the pair of contacts 279 of switch 280 to de-energize the solenoid 281 of switch 282 and simultaneously close pair of contacts 290. These contacts complete a circuit from source line 206 and by line 291 to valve 276 to reverse the same so that cylinder 81 lowers the rails 78 to deposit one or an empty rack 48 on the platform 62 and the remainder of the racks on the fixed rails 79. Lowering of rails 78 allows the opening of switch 277. Also by branch 292 from line 291, a circuit is made to timer 293 which is in circuit with source lines 206 and 207.

After a suitable delay interval, timer 293 completes a circuit by line 294 to a valve 295 and thence to source 207; said valve being associated with cylinder 121 which operates to lift an empty rack 48 by bar 125 from the end of platform 84 adjoining the inner end of tunnel E. At upper limit of movement of bar 125, limit switch 296 is closed to complete a circuit by line 297 through normally closed contacts 298 of switch 299 to the solenoid 300 of a relay switch 301 and thence to source line 207. This causes pair of contacts 302, against spring 303, to complete a circuit by line 304 from source 206 to valve 305 and thence to source 207. Valve 305 is associated with cylinder 126 by means of which conveyor 120 will be moved from the end of tunnel E to the inner end of tunnel F. When the rack 48 on conveyor 120 is substantially centrally disposed with the rails 78 of walking beam or conveyor 77, switch 299 is engaged to open contacts 298, threby deenergizing solenoid 300 and separating contacts 302, and simultaneously closing pair of contacts 306. These contacts complete a circuit by line 307 to a timer 308, in circuit with source lines 206 and 207, and also by line 309 to valve 295 to cause the reversal thereof. This causes the cylinder 121 to lower the bar 125 and consequently deposit the rack 48, carried thereby, on the rails 83 and simultaneously open limit switches 296.

In timed relation, timer 308 completes a circuit by line 310 from source 206 through limit switch 311 to the solenoid 312 of relay switch 313 and thence to source line 207. Action of this switch closes contacts 314, against spring 315, to complete a circuit by line 316 from source line 206 to the opposite side of valve 305 and thence to source 207. This action is reflected in cylinder 126 to the end that the conveyor 120, with the bar 125 in a lowered position, is returned to its position in the platform 84 adjoining the tunnel E. At this point, the limit switch 311 is opened to deactive solenoid 312 and consequently permit spring 315 to open line 316 at contacts 314 while the switch 299 is disengaged to open contacts 306 and reclose contacts 298 thereof. However, after the interval of time required for the cyclic activity of the conveyor 120, the timer 308 continues the sequential movement of the racks 48 by initiating the operation of timer 317 through line 318; said timer being in circuit with source lines 206 and 207.

Now, timer 317 is adapted by line 319 through normally closed limit switch 320 to complete circuit from source 207 to solenoid 321 of relay switch 322 and thence to source 206. Activity of this switch produces closure of pairs of contacts 323 and 324, against spring 325, to complete circuits by lines 326 and 327 from source line 206 to valve 287 and a valve 328 and thence to source line 207 in each instance. The circuit through line 326 acts to reverse valve 287 whereby cylinder 80 operates to move the walking beam or conveyor 77 rearwardly from the loading area L and with the rails 78 thereof in their lowered position. This permits the switch 280 to open contacts 290 and close the contacts 279 thereof. On the other hand, line 327 in completing a circuit to the valve 328, connected to cylinder 55, causes the same to raise the rails 51 of the conveyor 49 and therewith the rack 48 on the rails 63 of platform 62 as well as the preceding racks loaded with glass sheets on the fixed rails 52. When the rails 78 of conveyor 77 are positioned with reference to the adjoining end of platform 84, limit switch 320 is opened to de-energize the solenoid 321 and consequently allow opening of contacts 323 and 324 by spring 325. However, precedent to opening of relay switch 322, and when rails 51 of conveyor 49 are suitably elevated, a switch 329 is closed to complete a circuit by line 330 through the normally closed contacts 331 of switch 332 to connect solenoid 333 of relay switch 334 to source line 206 and thence to source 207. Contacts 335, against spring 336 complete a circuit by line 337 from source 206 to valve 289 and thence to source 207 whereupon cylinder 54 becomes operable to cause the beam conveyor 49 to move rearwardly until the innermost rack 48 is advanced another sequential step toward the platform 84 in the transfer area G. At this point in the cyclic operation, the rearward movement of conveyor 49 will have released the switch 332 thereby opening the contacts 331 and closing contacts 339. The line circuit 330 will according be disconnected to deenergize solenoid 333 of relay switch 334 while closure of contacts 339 will complete line 340 from source 206 to valve 328 to reverse the same.

Since an empty rack 48 will now have been located at the loading or outer end of platform 62, a pair of glass sheets 31 and 32 can be positioned thereupon. The timer 242, during individual operation of the preheat section B, initiates a cycle by means of which the racks 48, loaded with pairs of glass sheets, will be introduced into the preheat tunnel E at suitably spaced intervals of time. As previously mentioned, the length of each time interval is substantially equal to that amount of time normally required to carry out the complete cycle for the sealing of one unit. In other words, the accumulative time elapsing between the entry of the glass sheets into the preheat tunnel E and their arrival in the transfer area G will assure the desired gradual heating of the same to the necessary temperature at which the sealing cycle is to be satisfactorily carried out.

At this time, the circuit through line 341 is completed, through contacts 340' and 341' of the switch 264, to line 241 and time 242. Consequently when the predetermined time for which the said timer has been adjusted has elapsed, the circuit of line 243' will be re-established to the timing relay 243 to institute another cycle.

When the innermost loaded rack 48 has been placed on the platform 84 in the transfer area G the switch 264 is moved to close contacts 344' and 345' while opening contacts 340' and 341'. Now, the preheat tunnel E will be filled with racks carrying pairs of glass sheets to gradually become heated and the carrier O is moved from the conditioning chamber M into the transfer area G of the sealing or fusing section C.

For this purpose, the manual switch 221 is again engaged to complete the circuit of line 224 thereby operating the motor 102 through relay switch 213 and is then reversed to complete the circuit of line 226 and halt the motor by opening of the switch 213, as previously described. Upon closure of manual switch 237, a pilot circuit from line 206 and by line 342 will be established to carry out the automatically occurring steps of the sealing operation. Then a manual switch 343 (FIG. 16) is momentarily closed to start such a cycle. Thus, switch 343 by line 344 from source 206 creates a starter circuit to a plurality of timers 345, 346, 347 and 348 (FIG. 17).

Accordingly, the timing relay 345, after a suitably adjusted interval, completes a circuit by line 349 from source 342 to a valve 350 and thence to source 207. The valve 350 is suitably connected to the cylinder 117 and, upon actuation, directs pressure to the lower end of said cylinder. This operates to raise the elevator bracket 119 by piston rod 118 and thereby lift a rack 48, loaded with glass sheets 31 and 32, upwardly until the sheets are centered, in elevation, between the vacuum platens 106 351 until the sheets are properly positioned with reference to the said platens. Timer 346 by line 352 connects said valve to pilot source 342 and thence to opposite source 207 whereupon a pressure supply will be directed to the cylinder 104. This cylinder then causes outward motion of the shaft 103 to advance the platen 106 into surface engagement with the sheet 32 and consequently the sheet 31 into surface engagement with the platen 107.

Timer 347 is activated by branch line 353 from line 344 and line 354 through the normally closed contacts 355 of relay switch 356 and then by line 357 through normally closed manual switch 358 and line 359 connects source line 342 to the solenoid 360 of relay switch 361 and thence to opposite source line 207. Likewise, by branch 362 from line 359 through the closed pair of contacts 362' of relay switch 363, source line 342 is connected to the solenoid 364 of relay switch 365. These switches close their associated contacts 366 and 367 to complete the respective lines 368 and 369 from source 342 to the valves 111 and 114 and thence to opposite source 207. These valves, as aforementioned, control the evacuated conditions in conduits 110 and 113 from the vacuum source 112 to the platens 106 and 107 and the time 347 accordingly may be adjusted to cause a vacuous condition to become existent in the passageways 108 to secure the glass sheets 31 and 32 against the platens 106 and 107 in timed relation to the expected delay occurring after the bracket 119 has elevated the rack carrying the said sheets and then lowered the rack.

On the other hand, timer 345 may be adjusted, after the length of interval during which the bracket 119 continues to support the sheets 31 and 32; the shaft 103 advances the platen 106 and the valves 111 and 114 are opened, to produce lowering of the bracket 119. Thus, the timer by line 370 connects source line 342 to the opposite side of valve 350 and thence to source 207. This will reverse the cylinder 117 to lower the elevator bracket 119 by the rod 118 until the said bracket has descended to its rest position beneath the rails 83 of platform 84.

Upon completion of the total dwell period which is monitored by the timing relay 348, a circuit is completed from source 342 through line 371 to the solenoid 225 of relay switch 213 and thence to opposite source 207. This switch, as previously mentioned, is then actuated to close pairs of contacts 214, 215 and 216. Contacts 214 connect the line 208 to line 238 and motor 102; contacts 215 likewise connecting lines 207 and 239 while contacts 216 connect line 206 and line 240. Completion of the above-described circuits thus occurs substantially simultaneously with termination of the predetermined interval of dwell, and after which, the carrier O is caused to move toward the sealing area. Timer 348 also initiates the sequential cycling of the walking beam or conveyor devices by means of which the loaded racks 48 are advanced through the preheat tunnel E to the transfer area G and the empty racks are returned through the tunnel F to the loading section L. Thus, the timer 348 by line 372 (FIG. 17) completes, through the contacts 344'—345' of switch 264, a line circuit to line 243' and thus activate the timer 243 (FIG. 16), to produce a succeeding cycle of movement in the preheat section B and which has been previously set forth in detail.

In the interval of time during which the carrier O traverses the distance between area G and zone Y, the cylinder 104 is operated to retract the shaft 103, the platen 106, and glass sheet 32 vacuously carried thereby, a distance that will substantially determine the ultimate thickness of the space 34 in the completed glazing unit 30. For this purpose, a limit switch 373 is caused by movement of the carrier O to be closed and thus complete the circuit of a line 374 from source line 342, through a relay switch 375, to the opposite side of valve 351 and thence to source line 207. This will reverse the direction of pressure to the forward end of the cylinder 104. Suitable gaging means, generally designated by the numeral 375', may be employed to stop movement of the shaft 103 when the desired predetermined spacing between the glass sheets 31 and 32 has been obtained.

Now, in the event that it is found one or both of the glass sheets have become broken or overly warped, a manual switch 376 is employed to energize the opposite solenoid 227 of relay switch 213 through lines 377 and 226 from source line 342 and thence to source line 207. The relay is then actuated to disengage switch contacts 214, 215 and 216, thereby opening the circuits to the motor 102 substantially as the carrier O arrives at a point above the salvage pit 131. The switch 358 is now manually operated to disconnect lines 357 and 359 to de-energize solenoids 360 and 364 of relay switches 361 and 365 respectively; and allowing springs 378 and 379 to open contacts 366 and 367 to produce closure of the valves 111 and 114. This course of action reduces the vacuum at platens 106 and 107 with the consequent release of the glass sheets therefrom.

By means of a further manually operable switch 380, a circuit from source line 342 and by way of lines 381 and 231 is completed to the solenoid 232 of the relay switch 220 and thence to opposite source line 207 to thereby close contacts 217, 218 and 219 inclusive. This will reverse the polarity of motor 102 with the consequential rearward motion of the carrier O toward the transfer area G and eventual closure of a limit switch 382.

The switch 382 initiates a course of events which include completion of a line 383, from pilot line 342, and line 233 to the opposite solenoid 234 of switch 220 to halt the motor 102 upon opening of the contacts 217, 218 and 219. Line 383 also connects to line 344 to produce actuation of the elevator bracket 119 by the cylinder 117 to lift a loaded rack 48; forward motion of shaft 103 to engage a new pair of glass sheets 31 and 32 between the platens 106 and 107; the creation of vacuum by opening of the valves 111 and 114 and the final operation which involves lowering of the elevator bracket 119 before the carrier O again resumes its forward motion.

However, in carrying out the normal sequences of the substantially automatic sealing operation, and as the carrier O proceeds forwardly toward the burner arrangement 135, a limit switch 384 is temporarily engaged to establish a circuit from source line 342 and by line 385 through the solenoid 386 of relay switch 387 to close the contacts 388 thereof and complete line 389 from source line 342 to one side of a valve 390 and thence to source 207. Valve 390 is connected to cylinder 152 to the end that when the valve is actuated, it directs pressure to the lower end of said cylinder to raise the frame 150 and the burner arrangement 135 carried thereby. At a predetermined point in this upward movement, the collar 173, carried by one rod 162 on the frame 150, engages a limit switch 392 to complete a circuit by line 393 from pilot source 342 to the opposite solenoid 394 of relay switch 387, and thence to source line 207, which completion will produce disengagement of contacts 388 and consequent opening of the lines 385 and 389.

As the leading corners of the lower edge portions of sheets 31 and 32 pass through the indicator device 145, the elevation of the plane in which they are carried will be influential in causing said device to either produce raising or lowering of the base plate 138 until the burners 136 and 141, and the forming rolls 140 therebetween, are properly located at a corresponding elevation to carry out the sealing steps of fusing, forming and fire-polishing of the side wall formed by the said edge portions. The indicator device, as clearly disclosed in the aforementioned Montgomery patent, causes the operation of switch controls, generally indicated by the panel 395, to complete circuits either by way of line 396 or line 397 to a valve 398. This valve is connected to the cylinder 157, which as previously described, supports the base plate 138 on the movable base 159 bodily carried on the frame 150. Thus, in response to the indicator device 145, the control through either of the line 396 or 397 will activate the valve 398 and cylinder 157 to raise or lower the base plate 138 independently of the initial upward, or eventual downward, movement of the frame 150 as produced by the cylinder 152.

When the following corners of the glass sheets approach the vicinity of the fusing burners 136, a limit switch 399 is engaged to produce the operation of a feeder device, generally designated by the panel 400, which as aforementioned, supplies and guidingly supports a small metal tube between the fusing edge portions of the sheets. As herein disclosed, the feeder device 400 only operates during formation of one side wall 33 and consequently it has been found advantageous to employ the switch 399 as a control for a counter timer 401 adapted by a predetermined setting to function only once during the sealing of the four sides of the glass sheets. Thus, the switch 399 by line 402 from source line 342 completes a circuit to the timer 401, which is in circuit with the source lines 342 and 207, whereupon an impulse circuit is established by line 403 to the feeder device 400 and thence to source line 207.

Upon completion of the sealing along one edge portion of the sheets 31 and 32, the carrier O is moved forwardly until it brings about closure of a limit switch 404. This switch by line 405, through the normally closed contacts 406 of relay switch 407, connects through line 377 to the solenoid 227 of relay switch 213 to cause stopping of the motor 102 as the contacts 214, 215 and 216 thereof are opened. By means of branch line 408 the circuit from source line 342 through switch 404 is also extended to the opposite side of the valve 390 as well as to timing relay 409 and counting timer 410. Valve 390, when reversed, directs pressure to the upper end of cylinder 152 thereby lowering the frame 150 and burner arrangement 135 to their rest position. On the other hand, timer 409 sets up a delay interval while the burners are lowered and then operates to complete a circuit by line 411 from the pilot 342 and through normally closed contacts 412 of relay switch 407 to line 381 and solenoid 232 of relay switch 220. This acts to reverse the polarity of the motor 102 to cause the same to move the carrier O rearwardly.

The counting timer 410 is adapted to monitor the total number of steps sequentially occurring in a complete cycle of forming a double glazed unit. That is to say, when the timer is activated three times, the carrier O is returned each time to a position in advance of the burner arrangement 135 preparatory to the sealing of another side of the glass sheets and, upon the fourth activation, becomes operable to render the limit switch 404 inoperative thereby permitting the motor 102 to continue forward movement of the carrier O until the transfer area K is reached.

However, after the first sealing step and when the timer 409 causes the return movement of the carrier O, it moves rearwardly until a limit switch 413 is engaged. Switch 413 connects to pilot source 342 through normally closed contacts 414 of relay switch 415 (FIG. 18) and by line 416 is adapted to complete a circuit by lines 233 and 417 to solenoid 234 of relay switch 220 to stop motor 102. Branch line 418 also completes a control circuit from pilot source line 342 to a plurality of timers 419, 420, 421, 422 and 423. Line 418 to timer 419 is completed through normally closed contacts 424 of relay switch 425 and line 426. Line 418 to timer 420 is likewise completed through the normally closed contacts 427 of relay switch 428 and line 429 while the control circuit to timer 422 is completed through normally closed contacts 430 of relay switch 431 and line 432, for purposes to be hereinafter more fully disclosed.

Timer 419, when originally activated, sets up a delay to permit partial hardening of the newly formed side wall 33 while the carrier O is stationary and then completes a circuit by line 433 from pilot source line 342 to the solenoid 434 of relay switch 363 thereby opening the line 362 at contacts 362' to de-energize solenoid 364 enabling spring 379 to open switch 365. This connects line 369, causing valve 114 to close conduit 113 between the platen 107 and vacuum source 112. This acts to release the sheet 31 from the surface of the platen.

Timer 420, after this action, completes a circuit through line 435 from source line 342 to valve 351 whereupon the cylinder 104 operates to withdraw sheets 31 and 32, united along one of their sides, from the surface of platen 107 by means of shaft 103 and platen 106. Timer 421 now activates to complete a circuit from pilot source line 342 through line 436 to the solenoid 437 of relay switch 438 and thence to source line 207. When activated, this switch closes contacts 439, 440 and 441 to complete circuits from sources 208, 207 and 206 to lines 442, 443 and 444 connecting to the indexing device 105 thereby producing a rotation of the glass sheets through an arc of 180° to locate the second or opposite longer side of the sheets 31 and 32 in position for the sealing operation. In timed relation to automatic stopping of the device 105, timer 421 becomes inactive whereupon the several contacts of switch 438 are opened as by spring 445. At this time also, the spacers or clips 129, previously described as being loosely mounted on the upper side of one sheet, will drop therefrom since these particular edges will presently be disposed at the bottom of the sheet. Consequently the spacers will be automatically discarded after the first sealing step.

Timer 422, after a delay interval overlapping the actions of timers 420 and 421, completes a circuit by line 446 from source 342 to reverse valve 351 and cause cylinder 104 to advance the sheets until sheet 31 is in surface contact with platen 107. Timer 419 now becomes inactive and spring 447 recloses contacts 362' of switch 363 to re-establish line 362 to the switch 365 and consequently reopen valve 114. This connects platen 107 to the vacuum source 112 whereby vacuous support for the sheet 31 is restored.

Thus, when the glass sheets have been turned and are again supported by vacuum on the platens 106 and 107, the delay interval for which the timer 423 has been adjusted will elapse and a circuit when completed by lines 448 and 371 to the solenoid 225 of relay switch 213. This, as previously explained, completes the circuits of motor 102 to cause the same to move the carrier O forward preparatory to the second sealing step. And during this forward motion, the line circuit 374 of switch 373 is opened at the contacts 449 of switch 375 whose solenoid 451 is energized by line 452 from pilot source 342 through timer 423 after the same has caused the closure of switch 213. Interruption of the control by switch 373 prevents the actuation of valve 351 to retract the platen 106 as carried out during the first sealing step. However, when the switches 384 and 399 are sequentially engaged, the burner arrangement 135 is, in the first instance, again raised and, in the second instance, the timer 401 is activated for a second counting impulse although no activity of the feeder device 400 ensues.

Again, as the switch 404 is closed, the lines 405 and 408 effect stoppage of the motor 102 as the solenoid 227 is energized by line 405 to open the respective contacts of relay switch 213, and the timers 409 and 410 are reactivated by the circuit of line 408. Timer 410, on the second actuating impulse, completes circuits through lines 453 and 454 from pilot source 342. By line 453, a circuit is made to a timer 455 which completes a circuit by line 456 to the solenoids 457 and 458 of relay switches 459 and 460 respectively. Closure of contacts 461 of switch 459 against spring 462 also opens contacts 463 thereof and completes line 464 to valve 465 to reverse the same and cause the cylinder 161 to move the platform 159 laterally to a position in which the burner arrangement 135 will be aligned with the vertical plane of the path along which the sheets 31 and 32 will be carried during the third and fourth sealing steps. For this purpose, timer 455 is preferably adjusted to hold the solenoids 457 and 458 energized during the ensuing third and fourth sealing steps.

On the other hand, solenoid 458 operates to open contacts 466 of switch 460 and close the contacts 467 against spring 468 to complete a circuit by line 469 to valve 470 and thence to source line 207. This valve is associated with the cylinder 169 and causes the same to lift switch lever 168 into the path traversed by the collar 173 on rod 162 carried by the frame 150. Actuation of the valves 465 and 470 may be accomplished during the interval during which the timer 409 is activated to complete the line 411 and through lines 381 and 231 energize the solenoid 232 of relay switch 220 whereby the motor 102 operates to move the carrier O rearwardly until the limit switch 413 is again engaged. Line 417 again energizes opposite solenoid 234 of the switch 220 to halt the motor 102 before the third sealing step.

Line 454 from timer 410, during the above-described sequence of events, completes a circuit to the solenoids 472 and 475 of relay switches 431 and 425 respectively, as well as to timer 473. Solenoid 472, when energized, opens lines 418 and 432 at contacts 430 while solenoid 475 acts to open a circuit of lines 418—426, connecting to timer 419, by separating contacts 424 against spring 476. Now, when line 418 from switch 413 again completes a circuit from pilot source 342, timers 420, 421 and 423 will respond but timers 419 and 422 will remain inactive. Accordingly, when the timer 473 becomes active, line 474 is completed by way of line 433 to the solenoid 434 of switch 363 thereby closing valve 114 and releasing sheet 31 from the surface of platen 107. Timer 420 again activates to reverse valve 351 by way of circuit line 435 whereupon the cylinder 104 causes the platen 106 to retract the partially completed unit from vacuous surface engagement with the platen 107. In timed relation, timer 421, by way of line 436 closes relay switch 438 to operate indexing device 105 and thus revolve the sheets 31 and 32 until their third sides are in sealing position. Since the sheets are now united along two sides, future vacuous support by the platen 107 has been found not entirely necessary and, since the third and fourth sides are usually of the shorter dimension, the third sides, initially will be at a lower elevation than the first or second sides and will traverse a horizontal path at an elevation indicated by the letter b in FIG. 10. Also, since the sheets 31 and 32 are carried in spaced relation from the platen 107, they will be carried in a vertical plane that is offset from the plane in which they were carried in the first and second sealing steps. One reason for this is to reduce, if not eliminate, any possibility for the surface of the sheet 31 to be marred by contact with the platen 107 during the later sealing steps. For this purpose, the cylinders 161 and 169 are operated to laterally shift the burner arrangement 135 and to shorten the vertical stroke produced by the cylinder 152, as above described.

When the timer 423 again completes line 448, the switch 213 is closed to operate the motor 102 and move the carrier O forwardly. Since the control of limit switch 373 is negated at switch 375, the valve 351 remains inactive; however, upon closure of switch 384, the circuit of line 385 is completed through solenoid 386 of switch 387 to close contacts 388 to complete the circuit by line 389 thereby reversing valve 390 to produce upward movement of the frame 150 by cylinder 152. Now, when the collar 173 causes closure of the switch 477 by lever 168, the circuit by line 478 from pilot source 342 will be completed to line 393 and consequently will activate solenoid 394 to open contacts 388. Likewise, engagement of the limit switch 399 imparts a third impulse to the counting timer 401. Thus, the third sealing step is carried out in a conventional manner, with the above-described modifications of position of the burner arrangement and, upon completion, the limit switch 404 is engaged to halt the motor 102 through line 405 and the timers 409 and 410 are again activated by line 408. Also, by line 408, the valve 390 is reversed to lower frame 150 by clinder 152.

Upon activation of timer 409, the line 411 is again completed through contacts 412 to line 381 to close contacts of relay switch 220 which causes the carrier O to move rearwardly. Now, upon activation of timer 410, a circuit will be completed by line 479 to the solenoids 480 and 481 of relay switches 428 and 431 respectively and thence to source 207. Substantially simultaneously the contacts 427 and 430 will open the associated lines 429 and 432 connecting between line 418 and timers 420 and 422. Likewise, timer 410 by line 482 completes a circuit from pilot source 342 to a timer 482' which is adjusted to monitor a time interval overlapping the fourth sealing step and until the carrier O conveys the completed unit toward the transfer area K. Timer 482' accordingly completes a line 483 from the source 342 to the solenoid 483' of relay switch 407 to open pairs of contacts 406 and 412 thereof. This action negates the utility of line switch 404 to stop forward motion of the carrier O upon completion of the fourth step since line 405 to lines 377 and 226 to switch solenoid 227 are open at contacts 406 while the line 411 from timer 409 to lines 381 and 231 to switch solenoid 232 are open at contacts 412.

Accordingly, during the fourth sealing step, the limit switch 384 will operate to cause elevation of the frame 150 by valve 390 and cylinder 152 while switch 399 will activate the counting timer 401 by a fourth impulse thereto. Consequently, when limit switch 404 is engaged, the open condition of line 405 will permit continued forward movement of the carrier O to the transfer area K and the limit switch 484 which completes a circuit from pilot source 342 by line 485 to lines 377 and 226 to open switch 213 and halt the motor 102. By line 486, a circuit is also completed to timers 487 and 488 (FIG. 18). Timer 487, after a delay interval to allow the carrier O to come to a stationary condition, completes a circuit from pilot source line 342 by line 489 to line 408 to reverse the valve 390 thereby lowering the frame 150 and then energize the solenoid 490 of relay switch 491 and thence to source line 207. This operates to complete circuits from lines 208, 207 and 266 through contacts 492, 493 and 494 and lines 495—444; 496—443 and 497—442 to the indexing device 105 to cause the same to rotate the completed unit through an arc of 90° in a reverse rotation to those produced during the second, third and fourth sealing steps. This is for the purpose of bringing the first edge that was sealed in to the lowermost side of the unit and this has been found preferable since the first completed side wall 333 will be substantially the same distance from the centers of the platens 106 and 107 as the edge portions of the sheets 31 and 32 from which the side wall was formed. Consequently, the length of upward movement of the elevator bracket 178 can be adjusted to the length of movement of the loading elevator bracket 119. And this reduces jarring of the unit as the rack 174 is raised thereagainst. The bracket 178 is raised and lowered by means of the cylinder 179 which is supplied with pressure through a valve 498 (FIG. 18).

Valve 498 is controlled by action of the timer 488 which by way of a circuit from pilot source 342 through switch 488' completes a line 499 to said valve and thence to source line 207 to reverse the valve and thereby cause the cylinder 179 to raise the elevator bracket 178 and rack 174 thereon into supporting relation to the completed unit 30 presently vacuously supported on the carrier O by the platen 106. Timer 488 then operates to complete a second circuit from pilot source 342 by way of line 500, which as shown in FIG. 18, causes the execution of several functions. Initially, line 500 connects to solenoid 501 of relay switch 356 (FIG. 17) and thence to source 207 to separate the contacts 355 and open the control lines 344, 353 and 354 for the timer 347 from source line 342. This operates to render said timer inactive whereupon the circuit of lines 357, 359 and 362 will be opened to the solenoids 360 and 364 whereby contacts 366 and 367 of switches 361 and 365 are separated by associated springs 378 and 379. This closes the valve 111, as well as the valve 114, and reduces the vacuum at the surface of the platen 106 and frees the unit 30 therefrom. Line 500 by branch 502 also produces reversal of valve 498 to lower the completed unit and rack 174 on the elevator bracket 178. Additionally, line 500 by branch 503 completes a circuit to the solenoid 232 of relay switch 220 (FIG. 17) to cause the carrier O by motor 102 to move rearwardly from the transfer area K to the transfer area G. Since during the previously occurring return movements of the carrier O, the switch 413 was adapted to open the switch 220 preparatory to a subsequent sealing step, provision is now made to render the switch 413 inoperable until the carrier O has been moved rearwardly therebeyond. The line 504 thus completes a circuit to solenoid 505 of relay switch 415 to produce opening of the line 416 as the contacts 414 are separated against action of spring 506. Line 500 by branch 507 lastly completes a circuit to timer 508 and thence to source line 207, which timer controls the operation of the sequential movements of the racks 174 through the tunnels H and J of the annealing section D.

The timer 508 (FIG. 18) is preferably adjusted to provide a delay interval until the rack 174 has been replaced on the platform 177 and the carrier O has been moved from the transfer area K and then completes a circuit from source 342 to line 509 to a valve 510 and thence to source 207. Valve 510 is connected to cylinder 185 which causes the rails 183 of the walking beam conveyor 181 to lift the immediate rack 174 on the platform 177 and the racks, presently supported on the fixed rails 190, upwardly until a limit switch 511 is engaged to complete a circuit from source 342 by line 512 through the normally closed contacts 513 of the switch 514 to the solenoid 515 of relay switch 516 and thence to source line 207. This produces engagement of pairs of contacts 517 and 518, against action of spring 519, to complete the circuits of lines 520 and 521 from source line 342. Line 520 connects to valve 522 and thence to source 207 whereupon cylinder 187 operates to move the walking beam conveyor 181 outwardly until the outermost rack 174 and unit 30 will be positioned above the platform 189 in the unloading area U. The conveyor 181 is caused to stop upon separation of the contacts 513 of switch 514 which de-energizes the solenoid 515 and permits spring 519 to open lines 520 and 521 upon separation of contacts 517 and 518. During forward motion of the conveyor 177, by reason of the circuit of line 521 to a valve 523, the cylinder 191 was caused to move the walking beam or conveyor 182 forwardly in the return tunnel J with the rails 184 thereof in a lowered position and until the forward ends are disposed beneath an unloaded rack 174 on the outwardly disposed end of platform 189.

Simultaneously with separation of contacts 513, engagement of contacts 524 completes a circuit from source 342 by line 525 to a timer 526, in circuit with sources 342 and 207, and by branch 527 to the valve 510 which causes the reversal thereof to the end that the cylinder 185 lowers the rails 183 and deposits one rack 174 on the platform 189 and the racks therebehind on the fixed rails 190 within the annealing tunnel H. This also operates to open limit switch 511. Timer 526 by line 528 is adapted to complete a circuit from source 342 to a valve 529 and thence to source line 207. Valve 529 is associated with cylinder 194 mounted on the carriage of conveyor 192 and consequently the cylinder is operated to lift the bar 193 to raise an empty rack 174 from the platform 177 adjoining the innermost end of the return tunnel J. When a limit switch 530 mounted on the conveyor 192 is engaged, a circuit from source line 342 is made by line 531 through the pair of contacts 532 of switch 533 to the solenoid 534 of relay switch 535 and thence to source line 207. Accordingly, engagement of pair of contacts 536, against action of spring 537 completes a circuit from line 342 by line 538 to valve 539 and thence to source 207. Valve 539 is associated with the cylinder 195 by means of which the conveyor 192 is moved to convey the empty rack 174 to the opposite end of platform 189 in the transfer area K.

Engagement of switch 533 now acts to separate contacts 532 to de-energize solenoid 534 to separate contacts 536 while causing closure of related contacts 540 to complete a circuit from source 342 by line 541 which is connected to the opposite side of valve 529 and by branch 542 to a timer 543, in circuit with the source lines 342 and 207. Reversal of valve 529 acts to lower the bar 193 so that a rack 174 will be deposited on platform 189 and simultaneously the limit switch 530 will be opened. Timer 543 completes a circuit from source 342 by line 544 through a normally closed switch 545 to the solenoid 546 of a relay switch 547 and thence to source 207. Upon engagement of the pair of contacts 548, against action of spring 549, a circuit will be made from source 342 by line 550 to the opposite side of valve 539 to cause the reversal thereof. This reversal acts to cause the cylinder 195 to move the conveyor 192 from the transfer area K to the innermost end of the return tunnel J and to open contacts 540 of switch 533 while closing contacts 532 thereof. At this limit of travel, the conveyor upon engagement with the limit switch 545 opens the line 544 thereby de-energizing the solenoid 546 and permitting spring 549 to separate contacts 548. Timer 543 then completes the line circuit 551 to timer 552 in circuit with source lines 342 and 207. Timer 552 by way of line 553 through a normally closed limit switch 554 energizes solenoid 555 of relay switch 556 and thence to source line 207. Switch 556 then engages pairs of contacts 557 and 558 against spring 559 to complete circuits from source 342 by lines 560 and 561 to valves 562 and 522 respectively and thence to source 207. Valve 562 is associated with the cylinder 196 which operates to raise the rails 184 of walking beam conveyor 182 and thereby lift the empty racks 174 on the fixed rails 201 in tunnel J as well as the rack presently resting on the adjacent end of the platform 189. On the other hand, line 561 is connected to valve 522 to reverse the same thereby causing cylinder 187 to move the walking beam conveyor 181 rearwardly in the annealing tunnel H until the switch 554 is opened to deenergize the solenoid 555 thereby opening the contacts 557 and 558 of switch 556. This rearward motion of the conveyor 181 also permits the opening of contacts 524 of switch 514 and closure of contacts 513.

However, before separation of the switch contacts 557, the rails 183 of walking beam 181 will have produced closure of the limit switch 563 to complete by line 564 a circuit from source line 342 through the normally closed pair of contacts 565 of switch 566 to the solenoid 567 of a relay switch 568, and thence to source 207, whereupon the contacts 569, against the action of spring 570, will complete a circuit by line 571 to the opposite side of valve 523 to reverse the same and cause the cylinder to move the walking beam 182 rearwardly until switch 566 is engaged. This act separates the contacts 565 thereof opening the circuit to switch solenoid 567 and simultaneously engaging the contacts 572 thereof to complete a circuit from source line 206 by line 573 to a timer 574, in circuit with source lines 342 and 207, as well as by branch 575 to the opposite side of valve 562 to reverse the same thereby influencing cylinder 196 to lower the rails 184 and place an empty rack 174 on the platform 177 while replacing the other empty racks on the fixed rails 201 after one further rearward step. Switch 563 is also thereby opened.

Timer 574 after a suitable delay completes a circuit from source line 342 through line 576 to valve 577 and to source line 207. This valve is associated with cylinder 203 to cause the same to raise the bar 202 of conveyor 200 and lift a loaded rack 174 from the end of platform 189 in the annealing tunnel H. At the upper limit of this motion, switch 578, on the carriage of conveyor 200, is engaged to complete a circuit from source line 342 through line 579 and normally closed contacts 580 of switch 581 to the solenoid 582 of a relay switch 583 and to source line 207. Engagement of switch contacts 584, against action of spring 585, establishes a circuit from source 342 by line 586 to valve 587 and to source 207 whereupon cylinder 204 becomes operable to cause movement of the conveyor 200 outwardly from the annealing tunnel H to the unloading area U at the outer end of the return tunnel J at which time switch 581 is engaged to separate contacts 580 with resultant opening of switch contacts 584 and engagement of contacts 588. A circuit is thus created from source line 342 by way of line 589 to the timer 590, in circuit with source lines 342 and 207, whereupon a circuit by line 591 is made from source line 342 to the opposite side of valve 577 and to source 207 whereupon the reversal of pressure to cylinder 203 causes same to lower the bar 202 of conveyor 200 thereby causing limit switch 578 to open. This locates the immediate rack 174 at the outer end of platform 189 and with the unit 30 positioned for removal from the rack.

After reversing valve 577, timer 590 becomes instrumental in reversing the valve 587 through line 592 which, from the source 342 and through normally closed contacts 593 of switch 594 is completed to the solenoid 595 of relay switch 596 and thence to source 207. This engages contacts 597, against action of spring 598, to complete a circuit from source 342 and line 599 to valve 587 and to source 207. Valve 587 thereupon reverses to cause cylinder 204 to move the conveyor 200 to its rest position inside the annealing tunnel H. This also reopens the contacts 588 of switch 581 and closes the contacts 580 thereof. Switch 594 is then engaged to separate contacts 593 to open circuit line 592 to solenoid 595 and simultaneously engage contacts 600 thereof, one side of which is connected to source line 342.

Now, the engagement of contacts 600 can be made operable to initiate an automatically repeating cycle of the walking beams 181 and 182 and conveyors 192 and 200 in the annealing section D or the sequential operation of these beams and conveyors can be made dependent upon eventual arrival of a subsequently completed unit 30 at the transfer area K as has been heretofore described. Manual control of these conditions may be had by means of the switch 488' having contacts 601 and 602, contact 601 being interposed in the line 342 connecting to a timer 603. Contact 601 connects to contact 604 to complete source line 342 to timer 488 by line 605.

Accordingly, when positioned as indicated in FIG. 18, the source line 342 is completed to timer 488 and the operations in the annealing section will be dependent upon its operation in response to activation of the limit switch 484. However, if the switch 488' is actuated to connect to contacts 602—606 a source line 607 from line 342 will be established through contacts 600, when closed, to the timer 603.

Thus when the contacts 602—606 are engaged simultaneously with separation of contacts 601—604, a circuit from line 342 will be automatically completed by line 607 to the timer 603 upon closure of contacts 600 of switch 594. Preferably on automatic cycling, this timer operates to progresively advance the completed units in sequential steps through the annealing tunnel H until the same has been cleared of completed units and after the automatic operation of the preheat section B and the sealing section C has been discontinued. Thus, upon closure of switch 236 (FIG. 16) a line 608 will be substituted for the pilot line 342 and the timer adjusted to function at the expiration of an interval substantially equal in length of time to the time predeterminedly established for the complete fabrication of double glazing unit 30. Of course, during such a timed delay, each rack 174 delivered into the unloading area U can be unloaded before being carried into the return tunnel J. The timer 603 is connected by line 609 to timer 508 and thus operates to initiate action of said timer in a parallel manner to that occasioned by activity of the timer 488.

Briefly reviewing operation of the sealing apparatus, it will be recalled that, in connection with FIG. 16, manual switches 221 and 228 are provided to cause forward and rearward movement of the carrier O from the track terminus W, to and/or through the conditioning chamber M and the fusing section C. Likewise upon closure of a suitable switch, similar to the switch 212, such movements can be duplicated to obtain like operation of the carrier O'. To initiate operation of the preheat section B, the manual switch 235 is employed thereby enabling the "loading" of the preheat tunnel E with racks 48 carrying pairs of glass sheets 31 and 32 to be suitably heated. Now when the innermost rack is positioned on the platform 84, switch 235 may be opened; switch 264 is reversed to complete the circuit of line 372 through contacts 344'—345'; the switch 237 is engaged to establish the pilot source line 342 and the switch 343 is momentarily closed to start the automatically occurring cycles of operation.

Accordingly, the pairs of glass sheets will be loaded onto racks 48 at the loading station L; progressively carried through the preheat section B; transferred to a carrier O at the area G; and, after being formed into an all-glass multiple sheet glazing unit, transferred to a rack 174 in the area K from which area the units are sequentially carried through the annealing section D until they arrive at the unloading station U. As previously noted, in the event that, the preheat and fusing sections B and C respectively are to be "shut-down," the switch 237 is opened and the switch 236 is closed to complete the circuit of line 608 whereby an auxiliary pilot line will be established individually for the automatic operation of the annealing section D.

While the completed units 30 have heretofore been described as being carried through the annealing tunnel H by means of the racks 174 and the combined actions of the conveyors 181 and 200, it is also herein contemplated that such units may be equally well carried through this particular tunnel by means of a hanger arrangement as shown in FIG. 19. This alternate or modified carrier means may be of especial utility in apparatus wherein units of considerably large dimension are to be produced and some difficulty may be encountered while the units are still at a relatively high heat and have a tendency to sag. For this purpose, there is provided in the annealing tunnel H and the return tunnel J pairs of tracks or rails 610 and 611. The tracks, in each instance, are adapted to support carts 612 by means of casters 613 associated therewith. Each cart is equipped with automatically operable hanger devices 614 by which the units will be engaged along their upper margins. As broadly indicated at 615, means in the form of a transfer unit, is provided at both ends of the tunnels H and J. Such a transfer unit may be caused to traverse laterally disposed tracks 616 by a cylinder 617.

According to this modified mode of operation, when a completed unit 30 is delivered into the transfer area K, it is received on a vertically movable bracket 618 that is caused to rise and descend by means of a cylinder 619. After the carrier O moves rearwardly toward the transfer area G, the unit 615 transfers a cart 612 from the inner end of tunnel J to the like end of tunnel H. The bracket 618 is again raised to bring the unit into suporting engagement with the hangers 614. By power means (not shown), the cart 612 is then removed from the transfer unit 615 and is propelled forwardly onto the tracks 610. In sequential order, these carts carry the units outwardly until, in the unloading area, a second transfer unit 615 carries the cart laterally into registration with the tracks 611 at the outer end of tunnel J. At this time the completed units will have been suitably annealed and can be removed for inspection.

While no details of the automatically controlled circuitry for the modified structure of FIG. 19 are herein set forth, it is believed quite apparent that by means of suitable instrumentalities substituted for those disclosed in FIG. 18 similar sequences of step-wise operations can be carried out without further modification to circuits as illustrated in FIGS. 16 and 17.

As hereinabove set forth in detail, the use of pairs of tunnels, arranged in parallel has been described in order that pairs of glass sheets 31 and 32 can be conveyed through the preheat tunnel E and then, as completed multiple sheet glazing units 30, be similarly carried through the annealing tunnel H. For this purpose, the walking beams 49 and 77 and conveyors 66 and 120 are employed to carry the racks 48 in their substantially continuous path from the loading station C, through the preheat tunnel E, through the transfer area G and the return tunnel F and again to the loading area. Likewise, the walking beams 181 and 182 and the conveyors 192 and 200 are employed to carry the racks 174 sequentially through and between the inner and outer ends of tunnels H and J.

It is further known that the structures of rack 48 and those of rack 174 may be combined in modified form of rack as shown in FIG. 20. This form of rack, generally designated by the numeral 620, utilizes the rack base 56 but is equipped with uprights 621 that are carried on a base pad 622. On one side of the longitudinal axis of the base 56, each upright is equipped with clamping devices 61 while on the other, in spaced relation, the pairs of rollers 176 are mounted. Likewise, each base pad 622 is provided with support devices 60 and 175. Racks of this modified structure are particularly well adapted to use with sealing apparatus of the character disclosed in FIGS. 21 and 22. And upon reference to either of these figures, it will be seen that one tunnel is provided for the preheating operation while one tunnel is provided for the annealing phase. Accordingly, in the sealing of a pair of glass sheets into an all-glass multiple sheet glazing unit in accordance with the embodiments of this invention, the racks 620 are adapted to be employed in both capacities.

Referring particularly to the modified form of apparatus shown in FIG. 21, it will be seen that the tunnel of the preheating section heretofore referred to as the "return" tunnel is employed as the annealing tunnel and that the annealing section D (FIG. 3), is dispensed with. Accordingly, the preheating tunnel E is in open communication at its exit end with the enclosed chamber of the sealing section C at the transfer area G and in spaced parallel relation to the annealing tunnel H. Likewise, the annealing tunnel H at its entry end is in open communication with the chamber of sealing section C at the transfer area K while the exit end thereof is located in substantially aligned relation to the entry end of the preheating tunnel E at the unloading and loading area U—L. This arrangement may be found expedient to also enable the inspection or repair of any or all walls of the respective tunnel since of course the heating cycle for preheating of the glass sheets in the tunnel E will be considerably higher than the cooling cycle for the completed glazing units while they are moved through the annealing tunnel H.

It is also to be noted in the modified apparatus that the sealing station C' is located in the chamber of the sealing section C in the end thereof remote from the annealing tunnel. In other words, in carrying out the preheating of glass sheets in the tunnel E and the annealing of the sealed glazing units in the annealing tunnel H, the modified racks 620 are adapted to be moved therethrough by means of an interlocked control circuit such as was described in connection with FIG. 16. On the other hand, while the functioning elements of the diagram circuit of FIG. 17 will generally carry out the sealing operation, it will be appreciated that certain obvious modifications will be made in such a circuit to move the completed glazing unit rearwardly over the sealing station C', through the transfer area G to the transfer area K where the unit is transferred onto a rack 620. The carrier O is then automatically moved forwardly to receive another pair of sheets in the transfer area G before the automatic cycle of the sealing operation is carried out as disclosed in FIG. 17.

In carrying out the sealing operations in this modified form of apparatus, the sheets 31 and 32 are thus loaded onto a rack 620 at one side thereof in the area L and in stepwise movements will be carried into the entry end of the tunnel E substantially in sequence with the removal of a completed unit 30 onto a rack 620 at the transfer area K. Since tunnels E and H are spaced apart, the racks will be carried laterally, at each end of the tunnels in a series of interrupted steps. Thus, a rack will be removed from the transfer area G to an intermediate position and then, in sequence, removed to the inner end of the annealing tunnel H at the transfer area K.

In considering FIG. 21, it will be noted that the racks 620 in the preheat tunnel E are spaced farther apart than those racks in the annealing tunnel H. The walking beam employed in the annealing area will therefore move the racks therein forwardly in a series of shorter motions to provide a time interval of adequate length for the gradual cooling of the units.

In other aspects of the modified apparatus, the sealing operation is carried out in the same manner as that heretofore disclosed. In other words, said apparatus is equipped with conditioning chambers M and N in which the vacuum platens of the carriers O and O' can be brought to temperatures compatible with those of the glass sheets. Likewise the carrier O moves forwardly from the transfer area G into and through the sealing station C' wherein the fusing or sealing operation is carried out. However, subsequently to the fourth sealing step, the carrier O is moved rearwardly past the area G to the transfer area K adjoining the inner end of the annealing tunnel H at which point the completed unit is removed from the carrier and replaced on a rack 620 but on the opposite side thereof. The carrier O then moves forwardly to the transfer area G to receive a subsequent pair of glass sheets 31 and 32 at the exit end of the tunnel E. It will thus be appreciated that by employing a rack adapted to carry either a pair of glass sheets to be preheated or a completed unit to be annealed, the so-called return tunnel of the preheating section can be used to advantage for annealing purposes.

A further modification of the apparatus for producing all-glass multiple sheet glazing units, as shown in FIG. 22, employs similarly located preheating and annealing tunnels and in addition provides for the production of two units simultaneously in substantially overlapping cycles of operation. In this modified apparatus, the preheating tunnel E and the annealing tunnel H are located in the spaced relation described in connection with the apparatus of FIG. 21 and in similar relation to the transfer areas G and K at the respective exit and entry ends thereof in the sealing section C. However, while in FIG. 21, a sealing station C' is located within the chamber of the sealing section C on the side of the preheating tunnel E remote from the annealing tunnel H, the modified apparatus of FIG. 22 contemplates the inclusion of a second sealing station Ca at the side of the annealing tunnel H remote from the preheating tunnel E. This arrangement of the sealing stations outwardly of the transfer areas G and K enables the substantially simultaneous formation of two sealed glazing units with suitable controls being employed to alternately cause the movement of one carrier into the transfer area G at the exit end of the preheating tunnel E and in timed sequence the movement of a second carrier thereto. Such controls will also include the provision of control means for alternately causing the carriers, one in timed relation to another, to be moved into the transfer area K at the entry end of the annealing tunnel H.

In the modified apparatus of FIG. 22, the conditioning chambers M and N are also located outwardly from the sealing stations C' and Ca for the purpose of mounting transverse tracks Z therebetween. Carriers, such as O or O', may thus be substituted by like carriers otherwise located in repair areas at the outer termini of such tracks or which have been moved into either of the conditioning chambers in order that the platens thereon may be suitably heated.

In carrying out the sealing operations in accordance with the embodiments of this invention but with the modifications disclosed in FIG. 22, the carrier O initially moves to the transfer area G and receives a pair of glass sheets between the vacuum platens thereof. The carrier then is moved forwardly toward the sealing station C' through which it is automatically controlled to carry out the sealing operation. After a suitable interval of time, as between the second and third steps in this operation, the carrier O' is activated to move forwardly from its indicated position through the area K to the transfer area G where it receives a pair of glass sheets. The carrier O' is then moved rearwardly over the sealing station Ca before the actual sealing operation is initiated.

Upon completion of one glazing unit by the automatically occurring steps of the carrier O, the same is moved rearwardly over the sealing station C' through the area G to the transfer area K to discharge the unit.

Now, while the carrier O is at this position of its movement, the second carrier O' will normally be moving forwardly and rearwardly relative to the sealing station Ca in the formation of a glazing unit. Consequently, the first carrier O with empty platens will move forwardly from the transfer area K to the transfer area G to receive another pair of preheated glass sheets well in advance of forward movement of the second carrier O' from the sealing station Ca to the transfer area K.

Accordingly, the novel features of this invention as exemplified in the modified apparatus of FIG. 21 will produce sealed glazing units in the same manner described in connection with the preferred form of apparatus of FIG. 3 but with the additional feature that the steps of preheating and annealing can be generally carried out in one section including two spaced tunnels arranged substantially at right angles to the sealing section of the apparatus. Moreover, with a similar arrangement of the preheating and annealing tunnels and by the inclusion of a second sealing station, as shown in FIG. 22, the production of sealed glazing units can be materially increased.

Due to the relatively small areas occupied by the apparatus, as shown in FIGS. 3, 21 or 22, it is entirely possible to install a complementary apparatus in the same vicinity as is illustrated in broken line in FIG. 3. Consequently, the utility of one station sealing apparatus will enable the production of glazing units of different dimensions to be carried out simultaneously in the same area and with relatively little or no increase in labor costs. More than this, and without departing from the essence of the invention, the initial structure and/or operation can be modified by the employment of the rack return tunnel, as in the case of the preheat section of the apparatus, as the annealing tunnel thereby reducing working area of the apparatus as well as the construction and maintenance costs thereof.

It is to be understood that the forms of the invention herewith shown and described are to be taken as illustrative embodiments only of the same, and that various changes in the shape, size and arrangement of parts may be resorted to without departing from the spirit of the invention.

We claim:

1. In apparatus for producing all-glass multiple sheet glazing units, a preheating section including a preheating tunnel, means for supporting pairs of glass sheets in vertically disposed face-to-face relation in said preheating tunnel, means for moving said supporting means and the pairs of glass sheets through the preheating tunnel in a direction normal to their surfaces, a sealing section extending transversely of the preheating section and including a sealing chamber in open communication with the exit end of the preheating tunnel and having a sealing station therein, means in the sealing station for sealing the edge portions of the glass sheets to one another to form a sealed glazing unit, means for supporting a pair of glass sheets in vertically disposed spaced face-to-face relation in the sealing chamber, means for moving said support means and pair of glass sheets carried thereby in an edgewise direction forwardly and rearwardly through the sealing station to seal the marginal edge portions of the sheets together, means for rotating the sheets at the end of each rearward movement to present another side of the sheets in position for sealing upon forward movement thereof through the sealing station, an annealing section arranged substantially parallel with the preheating section and including an annealing tunnel in open communication at the entry end thereof with the sealing chamber, and means for receiving the glazing units from the support means in the sealing chamber and conveying them in a vertical position through said annealing tunnel in a direction normal to their surfaces.

2. In apparatus for producing all-glass multiple sheet glazing units as claimed in claim 1, in which the exit end of the preheating tunnel, in open communication with the sealing chamber, defines a transfer area therebetween and in which the sheet supporting means in the preheating tunnel comprises a rack, means in said transfer area for lifting a rack and pair of glass sheets thereon into position where the sheets can be transferred to the support means in the sealing chamber, means for lowering the empty rack after the sheets have been removed therefrom, and means for preventing forward movement of the sheet support means toward the sealing station until the lifting means has been lowered.

3. In apparatus for producing all-glass multiple sheet glazing units as claimed in claim 2, in which the sheet support means in the sealing chamber comprises a pair of vacuum platens for receiving the glass sheets therebetween, and a carrier on which the vacuum platens are mounted.

4. In apparatus for producing all-glass multiple sheet glazing units as claimed in claim 3, including a source of vacuum, connections between the source of vacuum and each of the platens, means actuated by the carrier for opening and closing each of the vacuum connections, and means also actuated by the carrier when at least one side of the glass sheets has been sealed to maintain the vacuum to one platen to secure the partially formed unit thereto and to relieve the vacuum to the other platen to release the unit therefrom.

5. In apparatus for producing all-glass multiple sheet glazing units as claimed in claim 4, including means actuated by the carrier for moving the platen and partially formed unit carried thereby away from the other platen.

6. In apparatus for producing all-glass multiple sheet glazing units as claimed in claim 3, in which the rack lifting means includes a vertically movable hydraulic cylinder, means actuated by the carrier to cause the hydraulic cylinder to raise a rack and pair of glass sheets into position between the vacuum platens, means for moving the platens into engagement with the sheets, and means for creating a vacuum at the opposed surfaces of the platens to secure the glass sheets thereto.

7. In apparatus for producing all-glass multiple sheet glazing units as claimed in claim 6, including means actuated by the carrier upon forward movement thereof to the sealing station to advance a rack and second pair of glass sheets into the transfer area to be subsequently engaged by the vacuum platens.

8. In apparatus for producing all-glass multiple sheet glazing units as claimed in claim 1, in which said support means comprises a pair of vacuum platens engaging the sheets, means for temporarily halting the forward movement of the vacuum platens in advance of the sealing station, means for separating the vacuum platens to locate the glass sheets in spaced parallel relation to one another, and means for then moving the platens and spaced glass sheets forwardly through the sealing station.

9. In apparatus for producing all-glass multiple sheet glazing units as claimed in claim 8, including a carrier on which the vacuum platens are mounted, means on the carrier for supporting one of the platens for rotation relative to the other platen, and means actuated by the carrier for rotating said rotatable platen.

10. In apparatus for producing all-glass multiple sheet glazing units as claimed in claim 8, in which the sealing means comprises a support frame, a fusion burner on the support frame to heat marginal edge portions of the glass sheets to a pliable condition, a pair of forming rolls on the support frame for pressing the heated marginal edge portions into fusion contact to form an edge wall, hydraulic means for raising and lowering the support frame, means actuated by the carrier during forward movement thereof toward the sealing station for operating the hydraulic means to raise the support frame, and means actuaetd by the carrier after it leaves the sealing station for operating the hydraulic means to lower the support frame in advance of the rearward movement of the carrier through the sealing station.

11. In apparatus for producing all-glass multiple sheet glazing units as claimed in claim 10, including a dehydration hole forming means mounted on the support frame, and means actuated by the carrier during forward movement through the sealing station for operating said dehydration hole forming means to form a hole in an edge wall of the unit.

12. In apparatus for producing all-glass multiple sheet glazing units as claimed in claim 1, in which the entry end of the annealing tunnel, in open communication with the sealing chamber, defines a transfer area therebetween, and vertically movable means in said transfer area for receiving a sealed glazing unit in a vertical position from the support means in the sealing chamber and transferring it in a vertical position to said unit receiving means for movement through the annealing tunnel.

13. In apparatus for producing all-glass multiple sheet glazing units as claimed in claim 12, in which the sheet support means in the sealing chamber comprises a pair of vacuum platens for vertically supporting a unit therebetween, in which the unit receiving means comprises a rack, and in which the unit transfer means comprises a vertically movable hydraulic cylinder, means actuated by the vacuum platen support means for causing the cylinder to raise a rack into supporting engagement with the sealed glazing unit supported between the vacuum platens, means actuated by the vacuum platen support means for releasing the vacuum to the platens to transfer the unit from the platens to the rack, and means operated upon release of the vacuum to lower the rack and glazing unit.

14. In apparatus for producing all-glass multiple sheet glazing units as claimed in claim 13, including means for moving the rack and glazing unit forwardly through the annealing tunnel in a direction normal to the surfaces of the unit, and means actuated upon rearward movement of the vacuum platen support means through the sealing station to operate the rack moving means.

15. In apparatus for producing all-glass multiple sheet glazing units as claimed in claim 1, in which the exit end of the preheating tunnel is in open communication with the sealing chamber to provide a transfer area therebetween and in which the entry end of the annealing tunnel is also in open communication with the sealing chamber to provide a second transfer area therebetween, means for moving the sheet support means in the sealing chamber forwardly from the first transfer area to the sealing station wherein the marginal edge portions of the glass sheets are fused together to form a sealed glazing unit, means for moving the support means in the sealing chamber and the sealed glazing unit carried thereby rearwardly through the sealing station and the first transfer area to the second transfer area at the entry end of the annealing tunnel and means for then moving the support means forwardly from the second transfer area to the first transfer area to receive another pair of sheets in the exit end of the preheating tunnel.

16. In apparatus for producing all-glass multiple sheet glazing units as claimed in claim 1, in which the exit end of the preheating tunnel is in open communication with the sealing chamber to provide a transfer area therebetween and in which the entry end of the annealing tunnel is also in open communication with the sealing chamber to provide a second transfer area therebetween, racks for supporting a pair of glass sheets in vertical face-to-face relation in the preheating tunnel and for subsequently receiving a sealed glazing unit to carry the same through the annealing tunnel, means for moving said supporting racks from the first transfer area after the pair of glass sheets have been removed therefrom into the second transfer area for receiving the glazing unit, first and second sheet support means in the sealing chamber, a sealing station in the sealing chamber at the side of the first transfer area remote from the second transfer area, a second sealing station in the sealing chamber at the side of the second transfer area remote from the first transfer area, means for moving the first support means and pair of glass sheets carried thereby forwardly from the first transfer area to the first sealing station wherein the marginal edge portions of the glass sheets are fused together to form a sealed glazing unit, means for moving the second support means and pair of glass sheets carried thereby rearwardly from the first transfer area through the second transfer area to the second sealing station wherein the marginal edge portions of the second pair of glass sheets are fused together to form a sealed glazing unit, means for moving the first support means and glazing unit thereon rearwardly through the first sealing station and the first transfer area to the second transfer area where the glazing unit is transferred to one of said racks at the entry end of the annealing tunnel, means for moving the second support means and glazing unit thereon forwardly from the second sealing station to the second transfer area where the glazing unit is transferred to a second rack at the entry end of the annealing tunnel, and means for moving the first support means and the second support means in the sealing chamber forwardly from the second transfer area to the first transfer area to receive another pair of preheated glass sheets at the exit end of the preheating tunnel.

17. In apparatus for producing all-glass multiple sheet glazing units as claimed in claim 16, in which the sheet support means in the sealing chamber comprises first and second pairs of vacuum platens, means in the first transfer area for controlling movement of the first pair of platens and the second pair of platens into the first transfer area to alternately receive a pair of preheated glass sheets at the exit end of the preheating tunnel.

18. In apparatus for producing all-glass multiple sheet glazing units as claimed in claim 16, in which the rack for supporting a pair of glass sheets in the preheating tunnel and subsequently receiving a sealed glazing unit to carry the same through the annealing tunnel comprises a base, means on one side of the longitudinal axis of the base for supporting a pair of vertically disposed glass sheets in face-to-face relation in the preheating tunnel, means on the other side of the longitudinal axis of the base for receiving a sealed glazing unit in vertical position, means for moving a rack and pair of glass sheets forwardly through the preheating tunnel in a direction normal to their surfaces, means for moving the rack from the first transfer area to the second transfer area when the pair of preheated glass sheets have been removed therefrom, means for moving the rack forwardly from the second transfer area to carry a sealed glazing unit in vertical position through the annealing tunnel to the exit end thereof in a direction normal to its surfaces, and means for moving the rack from the exit end of the annealing tunnel to the entry end of the preheating tunnel after the glazing unit has been removed to receive a pair of glass sheets to be carried through said preheating tunnel.

References Cited in the file of this patent

UNITED STATES PATENTS

| | | |
|---|---|---|
| 2,624,979 | Clever et al. | Jan. 13, 1953 |
| 2,761,249 | Olson et al. | Sept. 4, 1956 |
| 2,954,644 | Montgomery | Oct. 4, 1960 |

UNITED STATES PATENT OFFICE
CERTIFICATE OF CORRECTION

Patent No. 3,097,943                                                July 16, 1963

Harry N. Dean et al.

It is hereby certified that error appears in the above numbered patent requiring correction and that the said Letters Patent should read as corrected below.

Column 6, line 64, for "tunels" read -- tunnels --; column 7, line 58, for "breaking" read -- breakage --; column 8, line 38, for "appar" read -- appear --; column 13, line 18, for "unnnel" read -- tunnell --; line 19, for "movablbe" read -- movable --; column 14, line 18, for "ened" read -- end --; column 17, line 32, for "switches" read -- switch --; line 43, for "deactive" read -- deactivate --; line 54, for "207" read -- 206 --; line 55, for "206" read -- 207 --; column 18, line 36, for "time" read -- timer --; line 69, after "106" insert -- and 107. Timer 346 is adjusted to delay action of a valve --; column 19, line 18, for "time" read -- timer --; column 26, lines 54 and 55, after "cylinder" insert -- 191 --; column 27, line 60, for "progresively" read -- progressively --; column 28, line 64, for "suporting" read -- supporting --; column 33, line 23, for "actuaetd" read -- actuated --.

Signed and sealed this 21st day of January 1964.

(SEAL)
Attest:
ERNEST W. SWIDER

Attesting Officer

EDWIN L. REYNOLDS

Acting Commissioner of Patents